United States Patent [19]
Bernard et al.

[11] Patent Number: 5,554,324
[45] Date of Patent: Sep. 10, 1996

[54] METHOD FOR PRODUCING MINERAL WOOL

[75] Inventors: Jean L. Bernard, Clermont; Serge Vignesoult, Paris; Jean Battigelli, Rantigny; Guy Berthier, Clermont, all of France; Hans Furtak, Speyer am Rhein, Germany

[73] Assignee: Isover Saint-Gobain, France

[21] Appl. No.: 215,650

[22] PCT Filed: Aug. 20, 1992

[86] PCT No.: PCT/EP92/01914

§ 371 Date: Jul. 20, 1994

§ 102(e) Date: Jul. 20, 1995

[87] PCT Pub. No.: WO94/04468

PCT Pub. Date: Mar. 3, 1994

[51] Int. Cl.⁶ .................................................. B29B 9/00
[52] U.S. Cl. ..................... 264/8; 425/8; 65/384; 65/460
[58] Field of Search ..................... 264/8; 425/8; 65/384, 65/460

[56] References Cited

U.S. PATENT DOCUMENTS 4,451,276  5/1984  Barthe et al. .

FOREIGN PATENT DOCUMENTS 0091381  1/1987  European Pat. Off. .
2443436  10/1989  France .

*Primary Examiner*—Christopher A. Fiorilla
*Attorney, Agent, or Firm*—Sterne, Kessler, Goldstein & Fox P.L.L.C.

[57] ABSTRACT

A method for producing mineral wool of a material which is highly fluid at an elevated liquidus temperature in particular above 1,200° C., with a viscosity of less than 5,000 poises at liquidus temperature, is proposed wherein the molten mineral material, after having destroyed all nuclei of crystallization, is supplied into a spinner (1') the peripheral wall (19) of which comprises a multiplicity of orifices with small diameters wherethrough said molten material is centrifuged to form filaments which, in a given case, are subjected to a supplementary attenuating effect of a preferably hot gas flow flowing along said peripheral wall (19) of said spinner (1') and generated by a concentric annular external burner (13). If fiberization of such a material is effected in the traditional way, a great proportion of unfiberized particles in the product will result. To avoid this, the spinner temperature in ongoing, continuous operation is maintained at a balanced value which is lower than or equal to the temperature at which the viscosity of the molten mineral material is 100 poises, and higher than the crystallization temperature in undercooled state of said material to be fiberized.

22 Claims, 10 Drawing Sheets

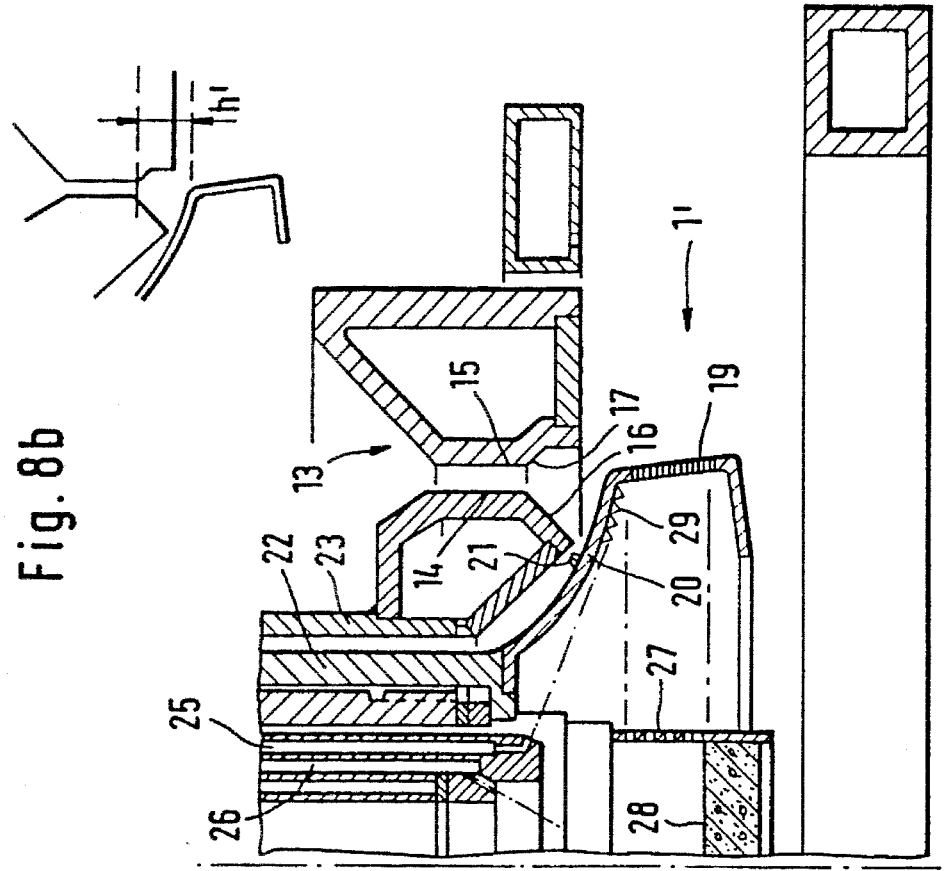
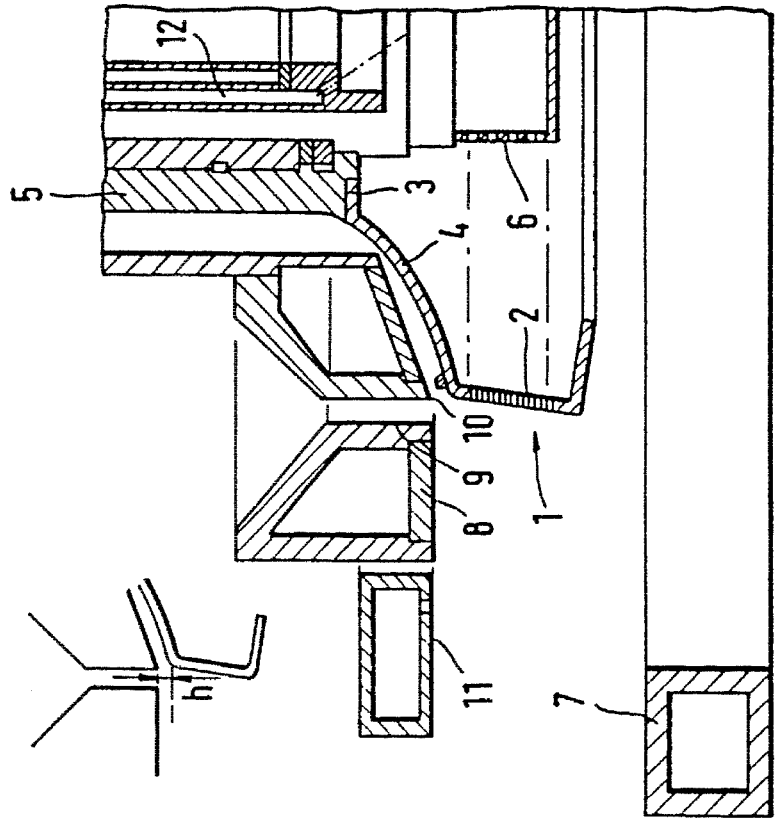

METHOD FOR PRODUCING MINERAL WOOL

BACKGROUND OF THE INVENTION

The present invention concerns a method for producing mineral wool consisting of thermoplastic mineral materials with high melting points or high liquidus temperatures, and more precisely such a method employing a fiberization process that comprises so-called internal centrifuging the molten mineral material. The thermoplastic materials in question are more precisely basaltic materials, either natural or modified basalts, or by-products of the iron and steel industry, in particular blast furnace slags (scoriae). In general, the invention applies to the production of mineral wool, so-called rock wool which has a wide range of use, particularly in the field of thermal and acoustic insulation.

On the one hand, these materials are chosen for their low costs, and on the other hand for their properties, especially their good resistance against high temperatures. Their production, however, creates specific problems. These problems particularly stem from the conditions in which these materials are workable.

Their high melting temperatures present a difficulty in itself. The melting temperature is the temperature to which the raw materials have to be heated to guarantee melting. Furthermore, where production is concerned, it is the temperature above which the material must be kept in order to flow through the fiberizing device.

Another particularity discerning these materials from the glasses mostly used for glass wool production is that, as a rule, they are highly fluid at temperatures in close proximity of their liquidus temperatures.

Also due to the required high temperatures, the devices getting into contact with the materials to be fiberized are subject to very intensive corrosion. Operational lifetime of these devices presents a problem even with conventional glasses. The problem becomes even more critical with high liquidus materials.

In the past, the above-mentioned difficulties meant that only certain fiberizing techniques could be applied with the materials in question. There are essentially two kinds of techniques: those employing centrifuging or spinning off the molten mineral material, and those where the material is fed through a stationary nozzle and attenuated into fibers by gas flows often accelerated to supersonic speeds (blast drawing method).

For techniques applying a fixed nozzle, it is necessary to utilize a nozzle which is able to resist the attack of the molten mineral material. Traditionally, these are platinum nozzles able to withstand these attacks even at such high temperatures. Production capacity of each nozzle, however, is limited. In addition, the use of such attenuating gas flows generates comparatively high energy costs.

Techniques employing centrifuging or spinning off allow considerable production quantities per unit. Those are techniques summarized under the generic term "external centrifuging", in order to indicate that the molten mineral material remains outside the spinner or centrifuging fiberizer. The molten mineral material is either applied to the front surface of a disk or to the peripheral surface of a cylindrical rotor, or a plurality thereof. An advantage of these techniques is the simplicity of the parts of the device entering into contact with the molten mineral material. With respect to this relative simplicity, the parts in question and in particular the spinner rims, are relatively cheap and therefore can be exchanged within relatively short time spans. The proportion of such material costs of total production costs remains relatively low. The fact that these device parts are subject to intensive wear upon contact with the molten mineral material does therefore not turn out to be an obstacle.

The main disadvantage of mineral wool production by external centrifuging lies in the fact that the properties of the final product are inferior to those of glass wool which is mainly produced by so-called "internal centrifuging".

In external centrifuging, the material flows onto the spinning wheels and is flung off them as a multiplicity of droplets. The fiber apparently forms once it is flung off, between the surface of the spinner and the droplet drawing the fiber after it. It is obvious that with such a fiberizing mechanism, a considerable portion of the spun-off materials remains in the form of unfiberized particles. Their proportion for particle sizes in excess of 100 μm can be as high as 40 weight percent of the material charged to the process. Although several methods are available for separating the unfiberized particles, the finished mineral wool is never entirely free of such particles which at best are of no use, and very much of a nuisance for particular applications.

It should be pointed out that drop formation is not only a necessary result of external centrifuging, but depends also on the rheological characteristics of the materials in question. Materials processed according to the invention generally have comparatively low viscosities, even at temperatures only slightly above liquidus temperature. The molten mineral material, which is relatively fluid, is difficult to fiberize as the filaments have a tendency to break and to form drops or beads. In a way, the technique of external centrifuging relies on this tendency, however without eliminating its disadvantages.

SUMMARY OF THE INVENTION

One essential objective of the present invention is to provide a process for producing mineral wool from a material with elevated liquidus temperature and low viscosity, for example a viscosity below 5,000 poises at liquidus temperature, and mostly lower than 3,000 or even 1,000 poises at liquidus temperature, in such conditions that a mineral wool largely free of unfiberized particles may be obtained. At the same time, the technique of the invention has to guarantee sufficiently long lifetimes of the utilized devices in order to comply with economical requirements, thus permitting substitution of this technique for the heretofore utilized ones.

By way of the invention, it is shown that it is possible to produce mineral wool of such a material with an elevated liquidus temperature, in particular with a liquidus of above 1,200° C., by spinning the molten mineral material off a spinner with a large number of small-diameter orifices in its peripheral wall, with the molten mineral material flowing into the spinner after all nuclei of crystallization have been destroyed, and the spinner temperature during ongoing operation being kept within such a temperature range the lower limit of which is defined by the temperature at which this material crystallizes in an undercooled state, and the upper limit of which is defined by the temperature at which the viscosity of the molten mineral material is 100 poises.

In the above definition, the term "during ongoing operation" is to be understood as opposed to transitional, start-up or shutdown stages, or more generally any period of time during which the flow rate of the molten mineral material is not constant. What is meant by spinner temperature is the temperature of any of its locations capable of being in contact with the molten mineral material during fiberization, in particular the peripheral wall over its entire height, and portions of the reinforcing wall or lower and upper reinforcing walls. As regards the spinner bottom wall—or the distributing means shaped like a basket or cup which beside other purposes also serves the function of bottom wall—only the lower limit has to be considered, as a very low viscosity may be accepted if compensated by cooling of the material before it arrives at the spinner proper. It is understood that the temperature of the material inside the spinner, and more particularly at the point of emanation from the orifice, is identical with the spinner temperature. It is therefore particularly this temperature which is relevant for problems of clogging orifices, particularly if the material devitrifies.

The above definition also refers to two further temperatures determining the characteristics of the molten mineral material: the liquidus temperature, and the crystallization temperature in undercooled state. The liquidus temperature is a value of the thermal equilibrium and corresponds to the lowest temperature at which crystals are not detected in the equilibrium. In order to determine this temperature, a sample of broken material is heated to the measurement temperature for a time span sufficient to produce a state of equilibrium (e.g. 16 hours under practical conditions). The sample is then taken from the oven and quenched to environment temperature, ground to form a thin chip and inspected under a microscope; the liquidus temperature then corresponds to the threshold temperature between the upper temperature range where no crystals can be found, and the lower range where the presence of crystals is noted. The term "liquidus temperature" by itself refers to the highest temperature at which the appearance of a first crystalline species is observed. More specific, the liquidus values can be measured for the appearance of each crystal species, or at least for predominant species at elevated temperatures that are relevant in the scope of the invention.

The crystallization temperature in undercooled state, on its part, does not correspond to a true thermal equilibrium, but defines a parameter which is measured in conditions relatively close to the conditions encountered during fiberization, and for this reason is of particular significance.

The crystallization temperature in undercooled state is characteristic of what occurs if the material which is cooled down is from the beginning of the cooling phase exempt of all nuclei of crystallization. Under such condition it is observed in most cases that the crystals form at a temperature below the liquidus temperature.

To obtain such material totally exempt of all nuclei of crystallization it is necessary to bring the molten material to a high temperature for a sufficiently long span of time. The minimum time period for the treatment depends on the temperature chosen for carrying out this treatment. In practical conditions, it must be as long as necessary to redissolve at passivation treatment temperature all of the crystals that had formed at a lower temperature where the material crystallizes rapidly. The higher the treatment temperature, the shorter is the required treatment time. If fiberization is effected immediately after melting, the melting temperature may be sufficiently elevated do destroy all nuclei of crystallization as the rock materials in question are relatively dark-colored, with a behavior not really dissimilar to the one of black bodies requiring overheating for melting. Otherwise, particularly if the fiberization is carried out starting from cullets or if the melting is brought about very quickly, e.g. by induction heating, an extra treatment may be necessary. In such a case, the material may be treated during a minimum period of 30 minutes by bringing it to $T_{SD}$ temperature (température supérieure de dévitrification=upper devitrification temperature), the temperature corresponding to total dissolution of the previously formed crystals within 30 minutes.

The crystallization temperature in undercooled state does not define a thermal equilibrium value to the extent that all the initial nuclei that were able to develop are destroyed. During short periods of treatment, the crystallization temperature in undercooled state increases gradually to the extent that the treatment time of the material at this temperature is extended. For longer treatment times, typically longer than 2 hours, the undercooling temperature stabilizes and no longer depends from the treatment time, which has been proven experimentally by measurements at 16 hours and 65 hours. As in the case of the liquidus temperature, a distinction can be made according to the crystal species, and the term "undercooling temperature" as such designates the "stabilized" undercooling temperature of the species with the highest temperature.

The temperatures of crystallization in undercooled state may be very different from the liquidus values, and distinctly lower than these. Divergences of a hundred degrees centigrade exist for certain materials. But above all, and this is a particularly remarkable fact, when working at a temperature in between the liquidus and the crystallization temperatures in undercooled state, the molten mineral material will not solidify inside the spinner, and clogging of the spinner orifices will not occur even in long-term industrial conditions.

Similar phenomena have been reported for traditional vitreous compositions which are characterized by high silica and alkali contents and whose crystallization speeds may furthermore well be measured. But with the materials of the invention, this phenomenon appeared largely unexpectedly as it was known that most of the materials taken into consideration here crystallize extremely quickly, thereby practically prohibiting any measurement of their crystallization speeds. This is a more serious problem in the case of a fiberization process by internal centrifuging as it must be considered that even if the average sojourn time of the molten mineral material inside the spinner is very short, it cannot be excluded that this sojourn time is long in certain places within the spinner, which is particulary true under conditions of ongoing industrial operation.

To return to the more general gist of the invention, choice of the crystallization temperature in undercooled state as the lower limit certainly has as a first consequence the possibility of operating at temperatures below the liquidus temperature. We have indicated that the liquidus temperatures of the molten mineral materials utilized in the scope of the invention generally lie above 1,200° C. However, the temperature limit during permanent operation of a spinner is in the order of 1,000°–1,100° C. for alloys traditionally utilized in the insulating glass wool industry, and in the order of 1,200° C.–1,400° C. for dispersion reinforced alloy metals commonly referred to as ODS (short for "Oxide Dispersion Strengthened") or also for ceramic materials. The liquidus values are thus quite in the vicinity of these operational limit temperatures, and it is easy to see all the advantages that may be derived from the possibility of working at lower temperatures, especially from the point of view of spinner operational life and the possibility of choosing spinner alloys which are relatively less heat resistant but have better mechanical resistance characteristics.

Futhermore, it has been indicated above that the possibility of fiberizing a given material by internal centrifuging is not exclusively limited by the spinner characteristics, but above all by the rheological characteristics of the material. Indeed, in order to fiberize a material, it is very much necessary that it will not crystallize inside the spinner, and that it has a viscosity permitting attenuation into fibers. It is commonly known that above 80,000 poises, viscosity becomes a virtually insurmountable obstacle for attenuation of the fibers, at least under industrial conditions, but in fact with the materials considered in the scope of the invention with viscosities lower than 5,000, or even 1,000/2,000 poises at their liquidus temperatures, this value of 80,000 poises cannot be made use of in practice as the material from such much lower viscosity very suddenly passes to an indefinite value of viscosity. In such cases, the upper limit for viscosity is the one corresponding to the lowest temperature at which the viscosity μ of the material still behaves according to the so-called Vogel-Fulcher-Tammann equation $$lg\ \mu = A + \frac{B}{T-C}\ .$$

with T representing the temperature in °C. and with A, B and C representing constants typical for the material in question and being calculated in a manner known per se from three pairs of measurements of μ and T of this material. In most cases, this limit to be considered will actually be in the order of 3,500 or even 3,000 poises (i.e. a value of lg μ between 3.47 and 3.54; for this reason, the temperature corresponding to lg μ=3.5 will be given in the following). Apart from this, beyond 3,000/3,500 poises, viscosity complicates passage of the material through the spinner orifices.

On the other hand, the material must not be too fluid at the moment of attenuation into fibers. Below a value of 100 poises (lg μ=2), and sometimes even experimentally below 200–320/350 poises (lg μ=2.3 to lg μ=2.5), the molten mineral material will form droplets which are present inside the product in the form of beads. In practical work with the present invention, bead rates lower than 10% (wt.) have been observed for viscosities in the order of 100 poises, and bead rates lower than 5% (wt.) for viscosities in excess of 320/350 poises. It must be pointed out that this limit of 100 poises is relatively high and characteristic for the invention; with external centrifuging, the material is worked at viscosities as low as several tens of poises and, as mentioned above, with very important amounts of beads formed. Numerous materials of the rock type present viscosities below this limit value of 100/320(350) poises at their liquidus temperatures; they are thus infiberizable if one as usually sets the liquidus temperature as the minimum temperature for fiberization. The invention permits working at much lower temperatures and thus working in a range with good viscosity.

Said problem of the material separating into drops and the resulting limit of 100/320(350) poises applies not only to the moment when the material passes through the spinner orifices, but also during the entire duration of its attenuation into fibers which occurs outside the spinner. Also, it must be taken care that the spinner is not inside an excessively hot environment which would unduly lower the viscosity of the material.

Subject matter of the invention are also compositions which are suitable for fiberization by an internal centrifuging process. The compositions which satitsfy the criteria of the invention are those compositions with a liquidus temperature above 1,200° C. and, at liquidus temperature, with viscosities below 5,000 poises or even 3,000 poises and 2,000 poises, and which have a difference of at least 50° C. between the temperature corresponding to a viscosity of 100 poises and the crystallization temperature in undercooled state. This safety margin of at least 50° C. compensates for the inevitable variations of the equilibrium temperature of the spinner. Particularly preferred are compositions with a difference of at least 50° C. between the temperature corresponding to a viscosity of approximately 320 poises and the crystallization temperature in undercooled state. Furthermore, preferred are compositions for which the working range so defined is at a relatively low level, e.g. lower than 1,350° C., and preferably even lower than 1,300° C., because of temperature resistance problems of the spinner material. The compositions thereby defined are typically so-called rock compositions obtained from one or, as the case may be, several natural minerals, and free or at least virtually free of additives, and especially without soda additions.

In order to keep to equilibrium temperature of the spinner between these limit values, it is necessary to heat it, even though the molten mineral material already constitutes a very considerable heat source. For this purpose, various heating devices are preferably utilized in combination.

Outside the spinner, this is in particular an annular external burner, preferably with internal combustion and producing an annular gas flow with an elevated temperature in the vicinity of the upper side of the spinner peripheral wall. Preferably, the hot gas flow is not only directed in such a way as to pass along the peripheral wall of the spinner, but such that it also envelopes part of the connecting band or "tulip" connecting the peripheral wall with the flange which is used to fasten the spinner to its support shaft (in the case of a bottomless spinner), or with the upper reinforcing collar (in the case of a spinner driven via its bottom wall), such that these parts are heated, too.

For this purpose, supplementary burners may be used whose flames are directed at the connecting band or "tulip". Another solution is to arrange the external burner at a greater distance from the upper side of the peripheral wall, such that the gas flow is already somewhat dilated before approaching the spinner and reaching a relevant part of the "tulip". Here, however, the distance should be kept so small that good precision of the impinging flow can be maintained. According to a third variant of the invention, an annular external burner may be used, the inner channel wall of which has a lesser diameter than the outer diameter of the spinner. In this case, for example, a burner with prolonged oblique discharge lips for delimiting a flaring jet of hot gases may be provided.

Again on the outer side of the spinner, preferably an induction heater is provided with an annular magnet for the passage of an electrical current with a high, or preferably a medium high, frequency. As known per se, the annular magnet may be arranged immediately below the spinner and concentrically to it. The combination of these two heating devices essentially contributes to a thermal balance of the spinner, and it must be noted that efficiency of these heating devices is better the more closely they are arranged near the spinner, and that in this way, the external burner predominantly heats the upper part of the centrifuge or spinner, whereas the annular magnet in its turn predominantly heats the bottom part of the spinner. As it was found that it is very difficult to heat the upper side of the peripheral wall without heating all the other nearby metal parts which in particular are enveloped by the hot gas flow, the described dual heating system avoids technological problems.

One further essential difference between these heating devices is their effect on the gas temperature in the vicinity of the spinner. The induction heater does not have a practical effect in this respect and therefore does not contribute to environmental heating apart from a small amount of heating by radiation. The annular external burner, on the other hand, inevitably must heat the environment to a considerable degree, although the secondary air sucked by the rotational movement of the spinner and the high speed of the annular gas flow in turn suppresses introduction of heat by the annular external burner into the environment. For optimum fiber quality, in particular under the aspect of the mechanical resistance, it is however not advantageous if the fibers are exposed to an excessively hot environment immediately after emanation from the spinner. Under these aspects, the temperature of the gas exhausted from the annular external burner is preferably limited.

In view of the high operating temperatures, the external heating devices may not suffice to maintain the thermal equilibrium of the spinner. This deficiency may be remedied by additional heating devices being arranged inside the spinner. This supplementary introduction of heat is preferably achieved by means of a diverging internal burner arranged concentrically to the support shaft of the spinner, the flames of which are directed at the inside of the peripheral wall. Preferably, the fuel/air ratio is adjusted such that the flame root is positioned in the immediate vicinity of the inner wall. A certain number of protrusions serving as flame retention means are furthermore advantageously provided at the inner wall of the "tulip". The diverging internal burner contributes preferably between 3 and 15% of the thermal input in ongoing, continuous operation—as far as it is not derived from the molten mineral material. This appears to be a contribution of only minor significance, but this heat input occurs with extraordinary precision, is arranged precisely at the required place, and is therefore extraordinarily efficient.

The diverging internal burner utilized during fiberization advantageously complements a central internal burner known from prior art where, however, it is exclusively employed during the start-up phase and in principle intended to heat the bottom wall of the spinner—or of the distributing means serving as a bottom wall and usually referred to as a cup, or, more generally, the central area of the spinner. The central internal burner pre-heats the cup or the bottom wall before feeding of the molten mineral material occurs. According to the invention, the central burner preferably is an annular burner with a converging flame, arranged between the spinner support shaft and the diverging central internal burner.

During the start-up phase, it is understood that the external heating facilities are also used. If necessary, even flame lances or similar devices may be utilized as supplementary heaters. The diverging internal burner is, of course, also used during the critical start-up phase while the thermal input of the molten mineral material is not yet available.

As the processed materials in certain cases have low viscosities compared to the viscosities of glasses usually processed by internal centrifuging, it is necessary to adjust the production capacity of each spinner orifice by correspondingly selecting the dimensions of the respective orifices. Thus the orifices usually have a diameter of between 0.7 and 1.2 mm in order to maintain a production capacity of about 1 kg per day and per orifice of glasses with viscosities in the order of 1,000 poises. For materials according to the invention, it is preferred to use a spinner with orifice diameters between 0.15 mm and 0.7 mm, and in particular between 0.15 mm and 0.4 mm.

The spinners utilized for carrying out the process according to the invention are preferably based on heat resistant alloys or ceramic materials. Usable materials are monolithic ceramic materials, in particular silicon nitride of the RBSN type (Reaction Bonded Silicon Nitride obtained by reaction sintering of a silicon powder in nitrogen atmosphere), of the $Si_3N_4$ or SIALON types, for instance of the following chemical composition expressed in weight percent:

| | |
|---|---|
| Si | 49.4% (wt.) |
| Al | 4.2% (wt.) |
| Y | 7.25% (wt.) |
| O | 4.0% (wt.) |
| N | 35.0% (wt.) |
| Fe | <2,000 ppm |
| Ca + Mg | <1,000 ppm |

Other silicon nitrides can equally be used. The workpiece may for instance be obtained by sintering, with this manufacturing process also allowing to obtain workpieces with relatively complex shapes and the possibility of preparing the orifices from the beginning by keeping them free by means of rods which are extracted after the workpiece has been formed, with the diameters of orifices finally being finished with a diamond tool. Preferably, non-porous ceramic materials are used the bulk density of which is as close as possible to their theoretical maximum density, thereby resulting in less easily corroding workpieces. This kind of material may be used up to temperatures in the vicinity of 1,300° C.

Another category of ceramic materials usable within the scope of the invention are composites with a ceramic matrix and fiber reinforcement which have a considerably improved toughness and hardness compared with monolithic ceramics. Especially suited herefor are the ceramic materials SiC—SiC or SiC-C with a silicon carbide matrix, reinforced with fibers also consisting of silicon carbide (SiC—SiC) or carbon (SiC-C). The workpiece is, for example, manufactured by initially breaking up a gaseous precursor which, upon its deposition, is ceramized in a preform produced by impregnation of a stack of adjacent fabric layers of silicon carbide fibers or carbon fibers, with the orifices in the peripheral wall preferably to be produced by laser beam penetration. Such a ceramic material can be used under non-oxidizing conditions at temperatures higher than 1,200° C. for SiC—SiC, and higher than 1,400° C. for SiC-C.

In a certain number of cases, it is enough if the material permits a temperature of 1,100°–1,200° C. in continuous operation. In these cases it is for instance possible to utilize cobalt-based and carbide-reinforced alloys, in particular tungsten carbides, or nickel-based and gamma prime (γ', stable form of the allotropic modification γ in a stable system) reinforced alloys. For instance, alloys of the following type can be utilized:

| | |
|---|---|
| Ni | 10% (wt.) |
| Cr | 29% (wt.) |
| W | 7.5% (wt.) |
| C | 0.25% (wt.) |
| Co | remainder |
| or | |
| Co | 19% (wt.) |
| Cr | 22.5% (wt.) |
| Al | 3.7% (wt.) |
| W | 2% (Wt.) |
| Ti | 1.9% (wt.) |
| C | 0.15% (wt.) |
| Ta | 1.4% (wt.) |
| Nb | 1% (wt.) |
| Ni | remainder |

A third category of materials eligible for use according to the invention are the ODS alloys mentioned previously. These ODS alloys are classified into two large families of materials, ferritic alloys, mostly based on iron as their name indicates, ordinarily furthermore containing chromium and aluminium, and austenitic alloys based on nickel-chromium.

The choice of an alloy is made by keeping well in mind the spinner temperature in ongoing, continuous operation, but also its resistance against corrosion caused by the molten mineral material, and its mechanical resistance characteristics.

As a general rule, ferritic alloys offer the best resistance against creep at high temperatures, but their resistance against thermal shock is relatively weak. The main cause of thermal shocks to a spinner is the start-up phase and consequently, pre-heating the spinner, when properly conducted, strongly reduces the risks connected with thermal shock. On the other hand, it is indicated that these ferritic alloys must only be used with materials to be fiberized whose content of iron, or more precisely of iron oxides, is relatively high, and at any rate in excess of 3 weight percent, otherwise these alloys will corrode very rapidly.

Austenitic alloys on a nickel-chromium base, on the other hand, offer excellent resistance against corrosion, in comparison with compositions rich in iron as well as compared with compositions poor in iron. Also, their resistance against thermal shock is noticeably superior to that of ferritic alloys. On the other hand, the temperature limit for utilization of these materials is noticeably lower than that of ferritic ODS alloys; nevertheless, as will be shown in the following, it was found that this limit temperature is quite often sufficient.

The oxide dispersed in the alloy to form the ODS is preferably yttrium oxide. The oxide content traditionally is very low in these materials. It is usually below 1 weight percent of the alloy.

Ferritic ODS alloys usable for spinners for fiberization, in particular compositions rich in iron, coomprise the following main composites:

| Cr | 13 to 30% (wt.) |
|---|---|
| Al | 2 to 7% (wt.) |
| Ti | less than 1% (wt.) |
| $Y_2O_3$ | 0.2 to 1% (wt.) |
| Fe | remainder |

A preferred alloy consists of:

| Fe | 74.5% (wt.) |
|---|---|
| Cr | 20% (wt.) |
| Al | 4.5% (wt.) |
| Ti | 0.5% (wt.) |
| $Y_2O_3$ | 0.5% (wt.) |

Austenitic alloys suitable for application of the process according to the invention may, for instance, have a following composition:

| Cr | 15 to 35% (wt.) |
|---|---|
| C | 0 to 1% (wt.) |
| Al | 0 to 2% (wt.) |
| Ti | 0 to 3% (wt.) |
| Fe | less than 2% (wt.) |
| $Y_2O_3$ | 0.2 to 1% (wt.) |
| Ni | remainder |

Production of the ODS alloys and shaping of the workpieces based on these alloys may follow the techniques described in the state of the art.

Materials which are usable according to the invention are in particular natural basalts, but also similar compositions such as those obtained either by adding composites to a basalt with the purpose of influencing certain ones of its properties, or by the combination of materials, thus making it possible to reproduce the chief characteristics of basalts, particularly their temperature behavior and, especially, the fact that melting is achieved at temperatures generally not below 1,200° C. These are also mineral compositions, such as blast furnace slags or all those compositions used for the production of so-called rock wool. The materials in question also include compositions qualifying for the term "vitreous". These latter ones are called "hard glasses" in order to illustrate the difficulty created by their melting temperatures.

Basalts and the minerals to be utilized within the scope of the invention are basically characterized in that, other than glass compositions, they have a relatively low content of alkaline metals. This content usually does not exceed 10 weight percent, and mostly lies below 5 weight percent of alkali oxides. This low alkali metal content is one of the reasons why melting occurs only at relatively high temperatures. On the other hand, the content of alkaline earth metals, especially of CaO+MgO, is higher than in glass compositions which fact renders an explanation for the high liquidus temperature of the materials to be used with the invention. Such content of alkaline earth metals is usually not below 10 weight percent. The total content of alkaline earth metals may amount to 35 weight percent or more. In the preferred embodiments of the invention, this content ranges between 8.5 and 20 weight percent.

As regards components of the structure $SiO_2$ or $Al_2O_3$ to which has to be added phosphorus pentoxide $P_2O_5$ which determines hardness of a glass, the preferred ratios according to the invention are lower than 75%. It has to be noted that the basalts are ordinarily richer in aluminum and correspondingly less rich in silica than the vitreous compositions. On the other hand, as indicated above, the "hard" glasses are within the scope of usefulness of the present invention insofar as they present the same characteristics regarding their temperature behavior and consequently necessitate the same conditions for their production.

Basalts are also considerably different from glass compositions because of their higher iron oxide contents. For true basalts, this oxide content lies above 3% (wt.), and usually in excess of 6% (wt.).

Another objective of the invention are mineral wool mats produced from a material having a high liquidus temperature, namely higher than 1,200° C., and with low viscosity at its liquidus temperature, such as a viscosity at liquidus temperature of less than 5,000 and most commonly less than 3,500 poises, having a content of beads with sizes larger than 100 μm of less than 10% (wt.) and preferably even less than 5% (wt.). More particularly, the object of the invention are mats with the the abovementioned characteristics whose composition comprises an aggregate content of silicon plus aluminum plus phosphorus pentoxide in the range of 67 and 73 weight percent, and a content of fluxing agents CaO+ MgO in the range of 9 and 18 weight percent.

The invention aims more particularly for mats with a Micronaire F/5 g of less than 6, and preferably in the range of 2.5 and 4.

The invention aims particularly for mats corresponding to compositions defined in the following table, all of which permit processing by fiberization under optimum conditions from the point of view of viscosity inside the spinner (in the range of 320/350 to 80,000 poises), without the problem of the material crystallizing inside the spinner, all the while operating at a temperature below 1,300° C. The compositions are indicated in weight percent after loss due to burning.

| | | | | | | | | |
|---|---|---|---|---|---|---|---|---|
| SiO$_2$ | 50.45 | 51.5 | 52.9 | 52.65 | 54.93 | 52.60 | 46.55 | 48.77 | 50.80 |
| Fe$_2$O$_3$ | 10.35 | 10.1 | 15.2 | 6.5 | 8.3 | 8.75 | 8.78 | 8.80 | 8.80 |
| Al$_2$O$_3$ | 17.35 | 18 | 13.6 | 19.85 | 17.17 | 14.58 | 14.7 | 14.65 | 14.65 |
| MnO | 0.17 | 0.19 | 0.2 | 0.1 | 0.15 | 0.12 | 0.17 | 0.17 | 0.17 |
| CaO | 9.90 | 8.9 | 5.75 | 5.3 | 7.12 | 12.20 | 12.25 | 12.25 | 12.25 |
| MgO | 7.05 | 6.4 | 3.8 | 3.3 | 5.10 | 6.33 | 6.2 | 6.2 | 6.2 |
| Na$_2$O | 3.35 | 3.5 | 2.7 | 6.1 | 3.55 | 2.24 | 2.2 | 2.2 | 2.2 |
| K$_2$O | 0.45 | 0.61 | 2.20 | 5.5 | 2.19 | 1.05 | 1.02 | 1.02 | 1.01 |
| TiO$_2$ | 0.75 | 0.66 | 3.0 | 0.5 | 1.20 | 1.82 | 1.89 | 1.9 | 1.9 |
| P$_2$O$_5$ | 0.15 | 0.12 | 0.6 | 0.1 | 0.28 | 0.30 | 6.21 | 4 | 2 |

The term "mineral wool mat" is intended to define all mineral wool products comprising felted fibers regardless of any subsequent treatment for compacting, curing etc.

Further details, features and advantages of the invention will be apparent from the following description of preferred embodiments in conjunction with the drawings.

BRIEF DESCRIPTION OF THE DRAWINGS

FIG. 8a is a schematized, longitudinal sectional view showing a fiberization device for the production of glass wool known from prior art;

FIG. 8b is a representation, corresponding to FIG. 8a, of an embodiment of a fiberization device according to the invention;

DETAILED DESCRIPTION OF THE INVENTION

Figure 1:
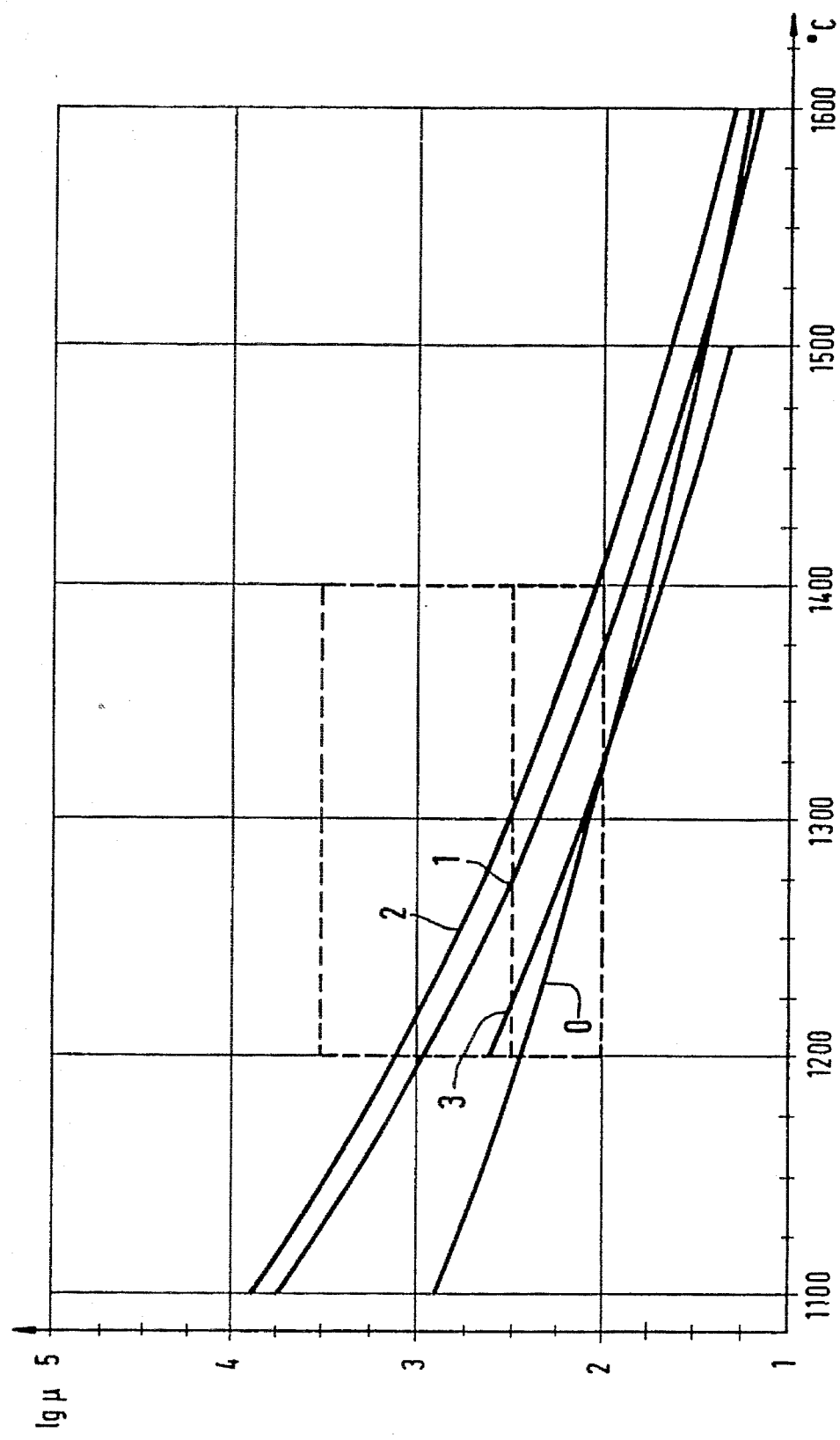
FIGS. 1 to 7 are viscosity/temperature diagrams for various compositions.
Figure 2:
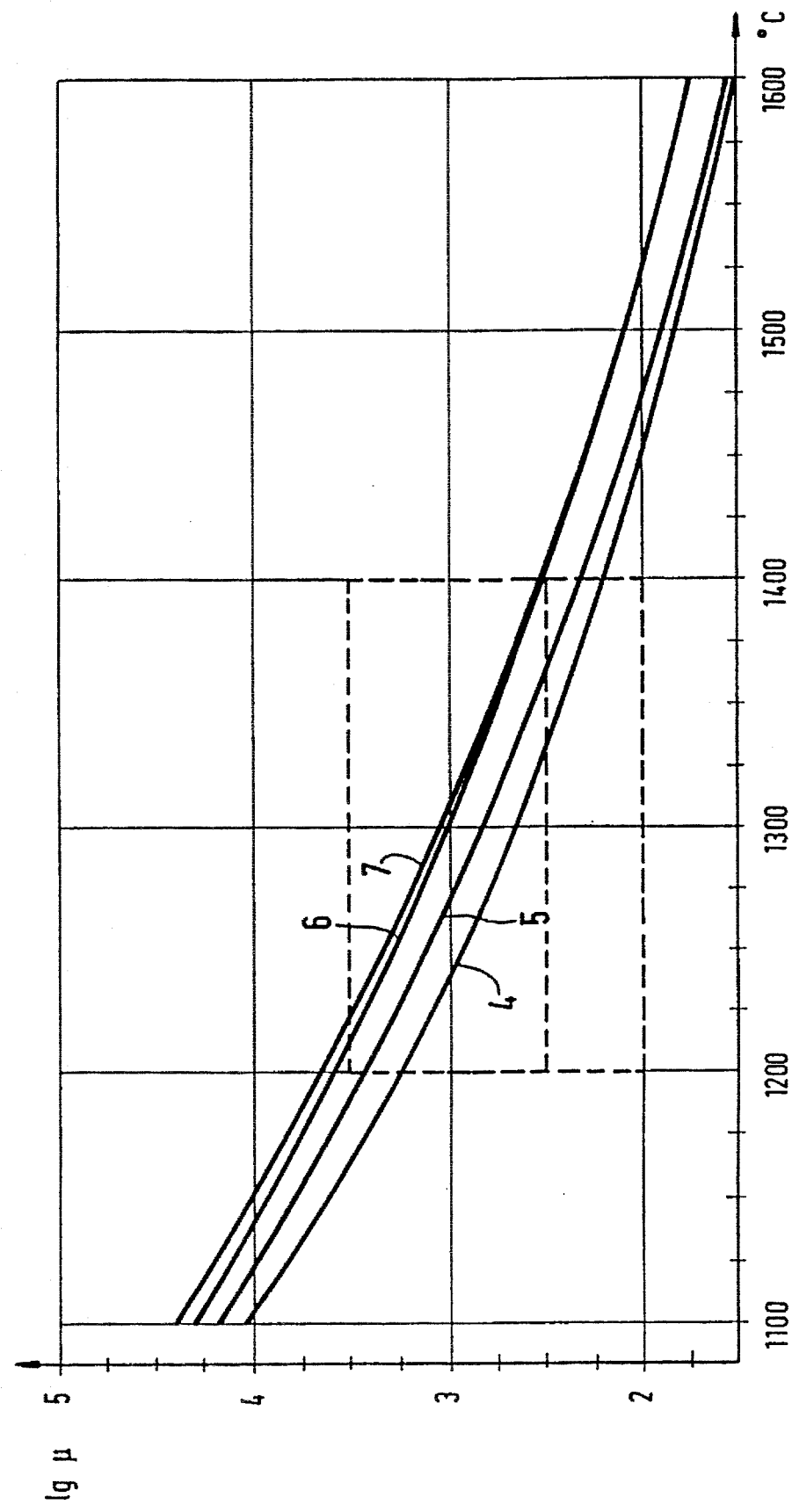
Figure 3:
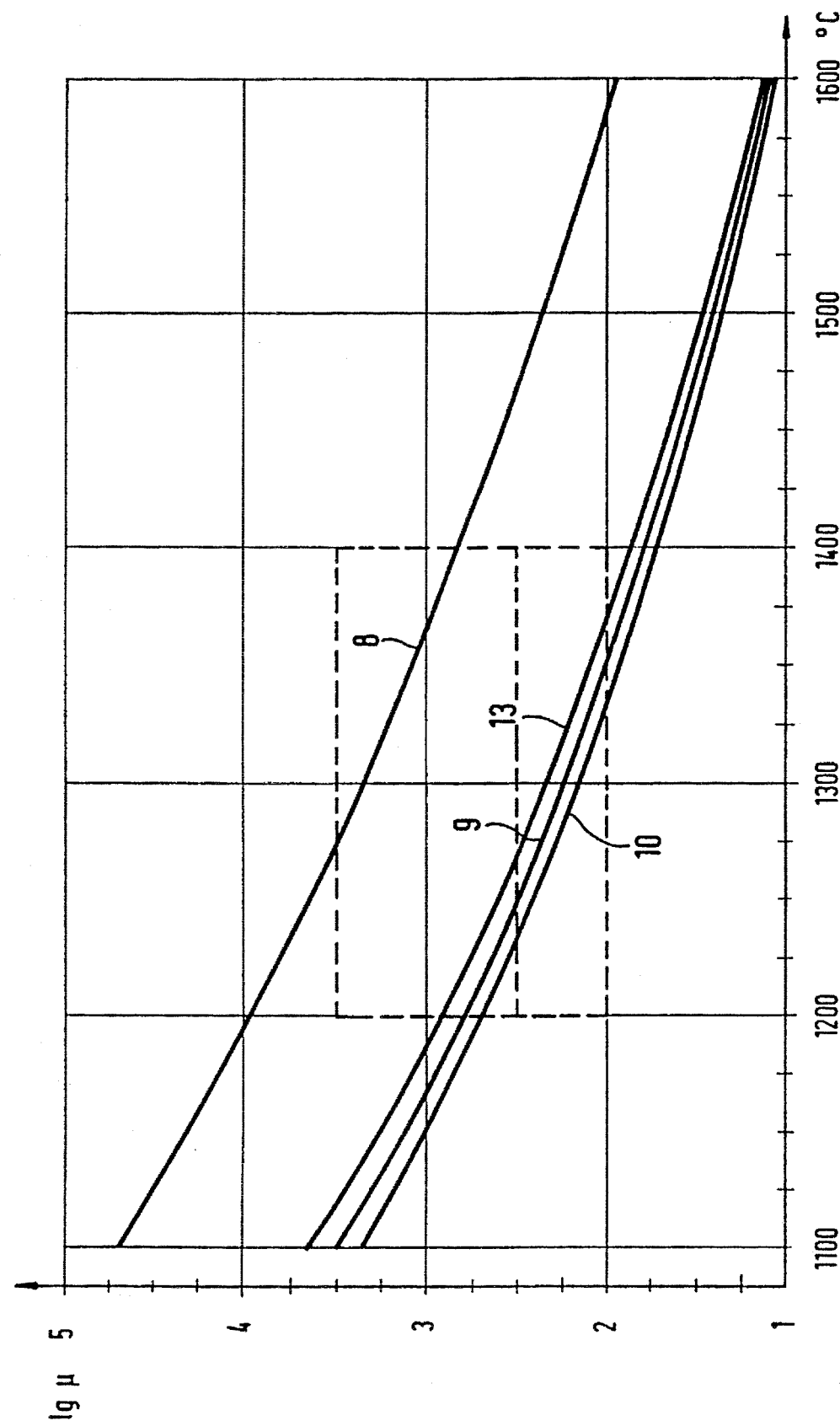
Figure 4:
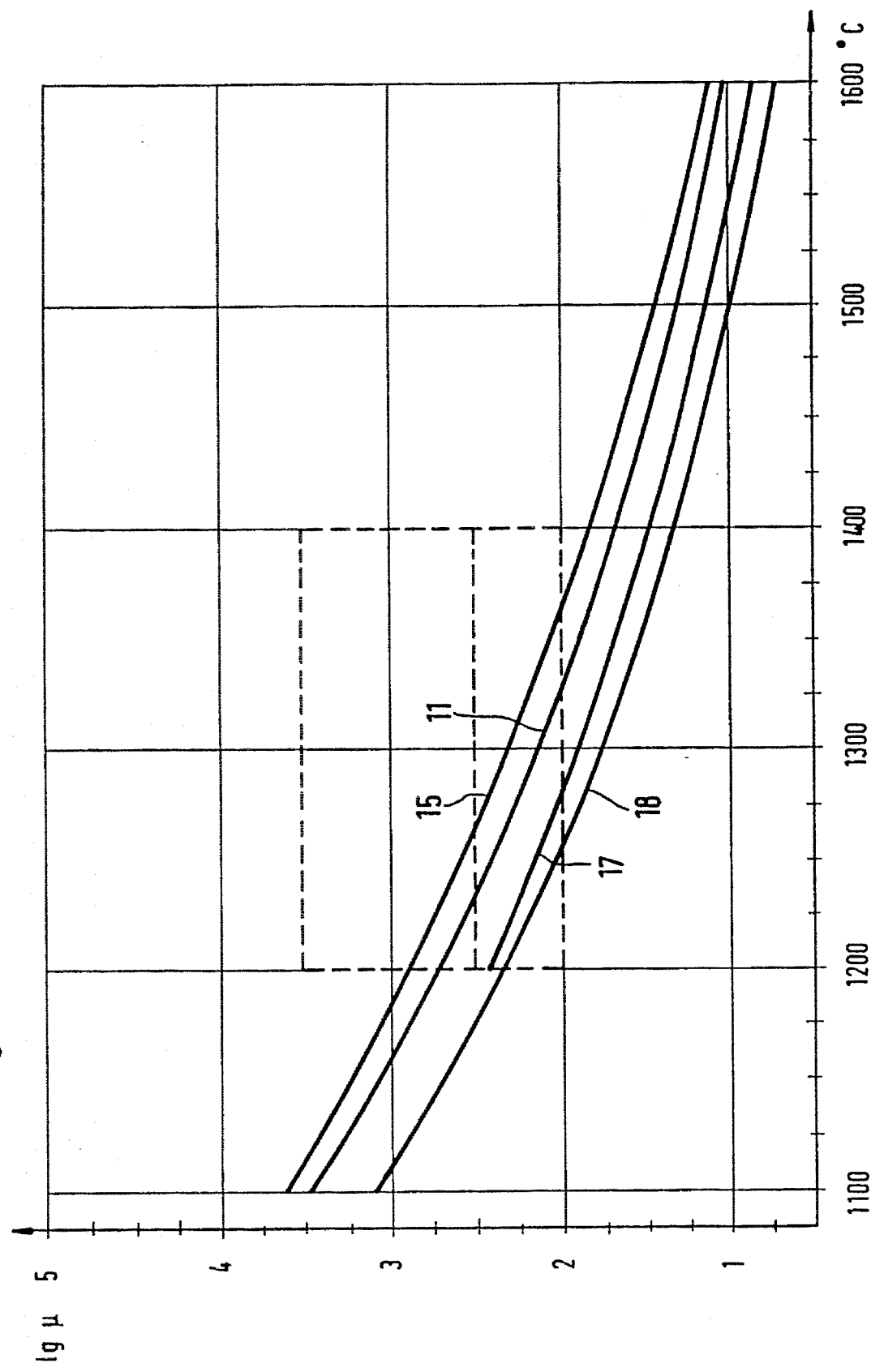
Figure 5:
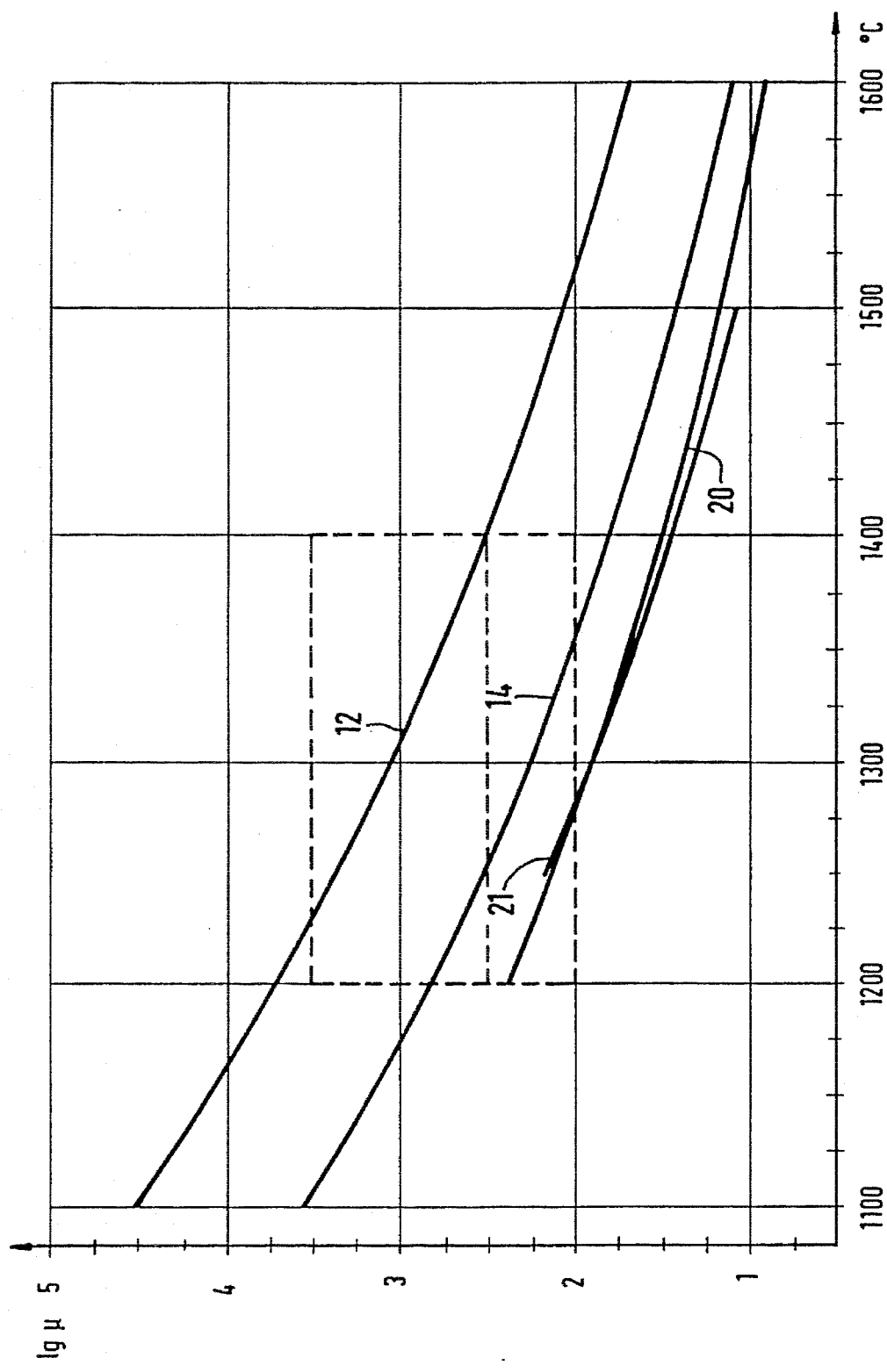
Figure 6:
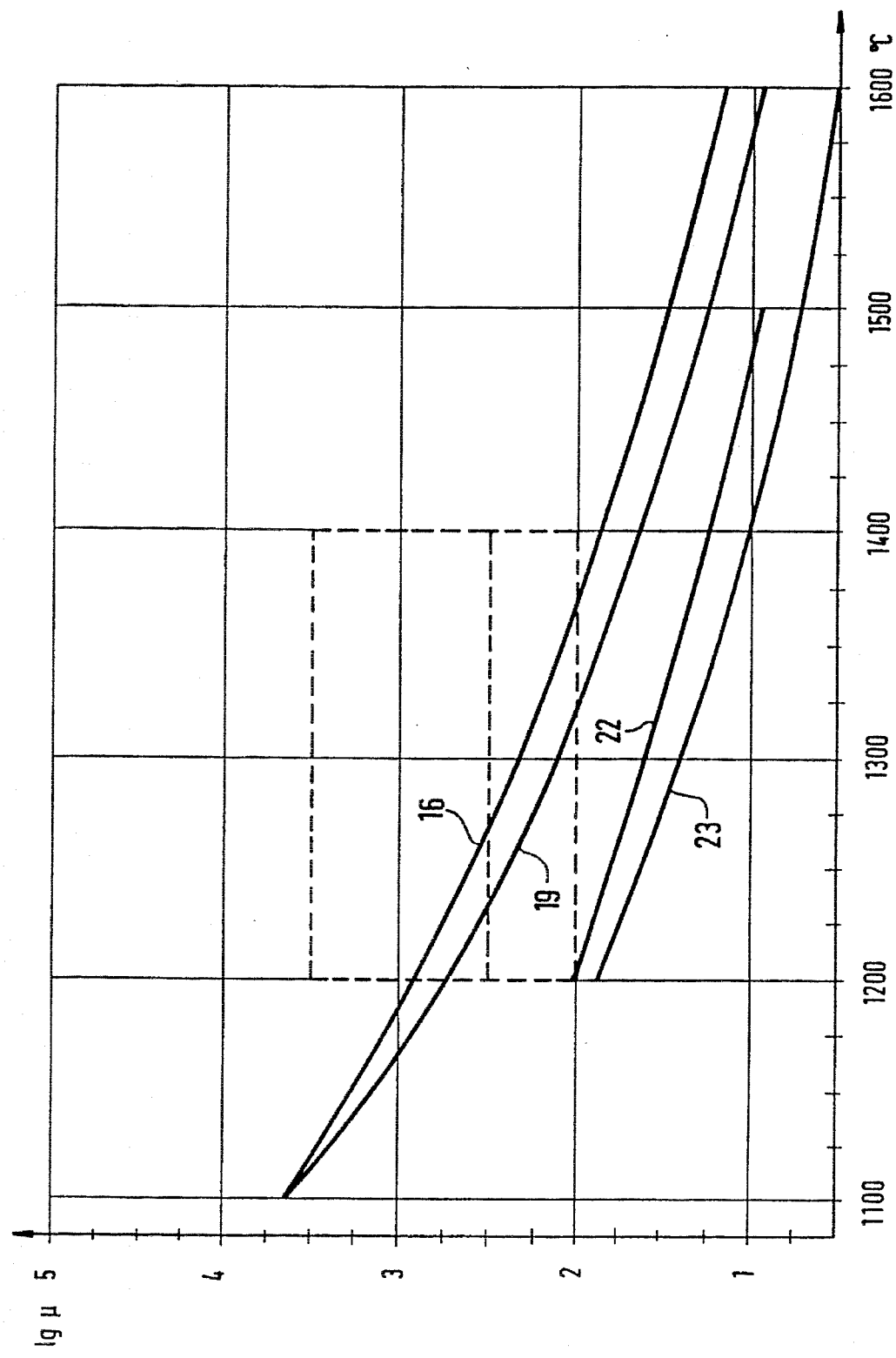
Figure 7:
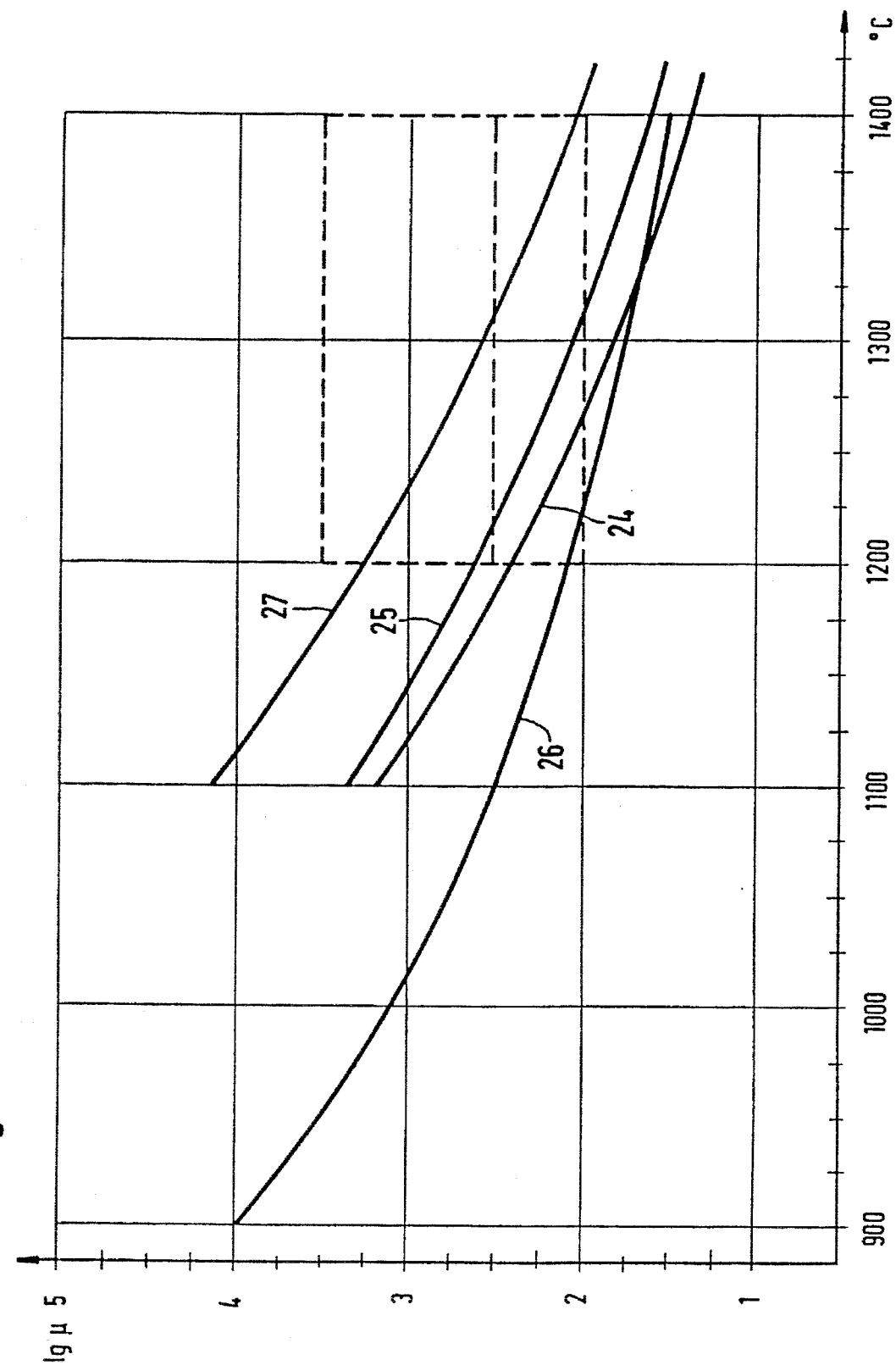

In a first stage, it is determined which compositions might be usable according to the invention. In the tables of compositions at the end of this specification, the tested compositions are given (components indicated in weight percent after loss due to burning). As regards viscosity, the temperature corresponding to the decimal logarithm of the viscosity (lg μ) in poises has been given. With the exception of composition 0, showing a conventional glass composition as usually fiberized by "internal centrifuging", all of the other materials have an elevated liquidus temperature and a low viscosity.

Furthermore, points of the viscosity/temperature graphs given in FIGS. 1 to 7 show up in these tables, with the decimal logarithm of viscosities in poises, and limited for each composition to the temperature range for which it was shown experimentally that the material behaves according to the law of Vogel-Fulcher-Tammann. On these graphs, the application limits for the invention are indicated by broken lines in the diagrams. The maximum applicable temperature depends on the resistance of the spinner alloys. For an acceptable operational life of ODS-type alloys or even ceramic types, the upper limit is at 1,400° C.

The value of 1,200° C. representing the lower limit is not a strict borderline, but is based on the fact that this is the ultimate limit attainable by means of the known, usual "internal centrifuging" techniques if, beside other disadvantages, a very short operational life of the spinner is accepted.

Beyond 3,000 poises (lg μ=3.47), the composition can no more be processed satisfactorily with the techniques in question, as the material no longer flows through the orifices in the required manner. This upper limit does not signify a practically important limitation insofar as the investigated compositions have far lower viscosities within the temperature range contemplated by the invention.

The lower limit of 100 poises is very important. As mentioned earlier, it becomes practically impossible in any case below this viscosity, but frequently already at viscosities of less than 200 poises (lg μ=approx. 2.3) or even 320/350 poises (lg μ=approx. 2.5), to successfully attenuate the filaments emanating from the orifices into fibers. In order to achieve a reasonable safety margin towards these low viscosities prohibiting fiberization by internal centrifuging, it is preferable to work with those compositions allowing processing at viscosities from 300 to 350 poises.

Also given for most of the compositions are the liquidus temperatures, with the values $T_{L1}$ and $T_{L2}$ corresponding to the liquidus temperature values for the first two of the observed crystal species. Except in the case of composition no. 12 where the results are reversed, the first temperature corresponds to the appearance of spinels, and the second temperature to the silicate phase. These liquidus temperatures were measured according to the following manner: a sample of 5 grams of broken material is heated in a platinum-gold crucible to the measurement temperature for a time span sufficient to produce the state of equilibrium (16 hours under practical conditions). The sample is then taken from the furnace, quenched to environment temperature and inspected under a microscope; the liquidus temperature then corresponds to the threshold temperature between the upper temperature range where no crystals can be found, and the lower range where the presence of crystals is noted.

Figure 9:
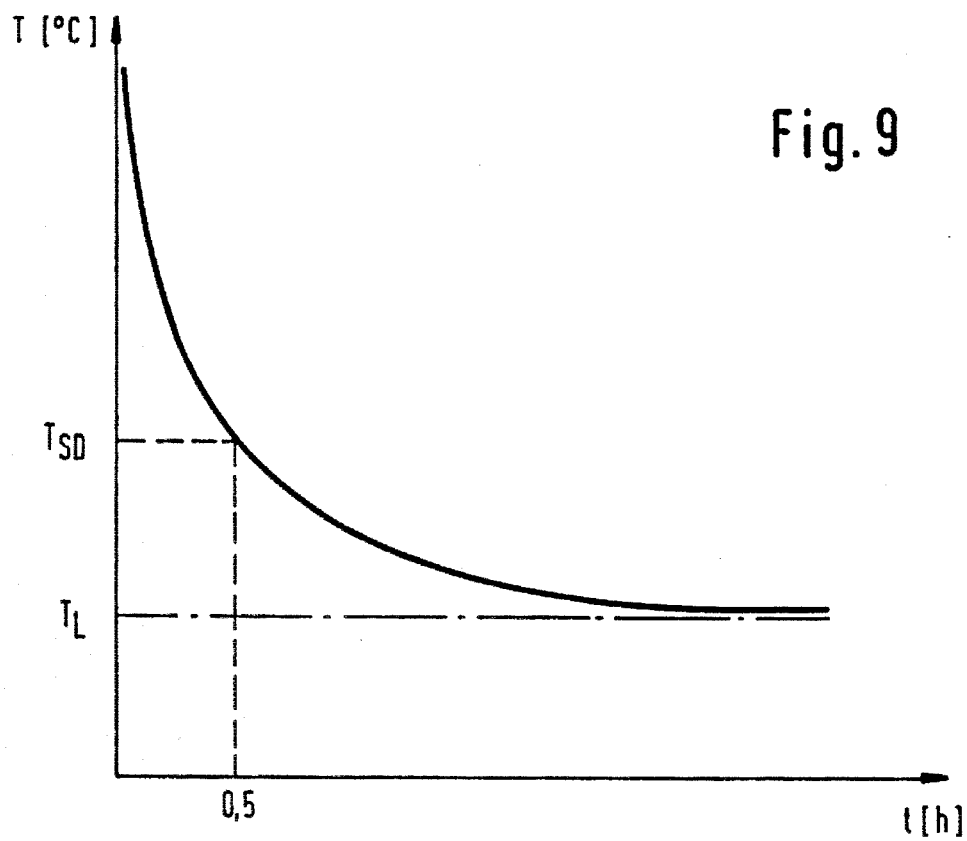
FIG. 9 is a graph illustrating the curve of crystal dissolution as a function of time and temperature.

In the tables at the end of the specification, the particular point in the curve of crystal dissolution as a function of time and of temperature has been given which corresponds to a duration of 30 minutes, i.e. the temperature $T_{SD}$ as explained above. The general configuration of this curve is shown in FIG. 9. The very high temperatures correspond to very short time spans; in other words, when proceeding to fiberization immediately after melting, i.e. after the material has been brought to temperatures typically in excess of 1,500° C. for more than 30 minutes in the case of basaltic materials, then it is not necessary to carry out any specific extra treatment to destroy all nuclei of crystallization. At the other extremity, this curve tends towards the liquidus temperature which would correspond to a dissolution time equal to infinity. $T_{SD}$ values were measured in the following way: the granular material was brought to a temperature where the sample is highly crystallized. For these tests, the material was thus brought to about 1,150° C. for one hour. With the crystals thus formed, the material was heated to the measurement temperature, and such one of the measurement temperatures was then identified as $T_{SD}$ at which all of the previously formed crystals dissolved within 30 minutes. This value therefore is an indication for the temperature to which the composition must be heated in order to dissolve the crystals formed, for example, in a cool zone of the spinner. In the scope of the invention, the $T_{SD}$ is above all significant in the sense that it corresponds to the minimum temperature to which the sample must be heated in order to destroy the crystallization nuclei within a time span of 30 minutes.

Figure 10:
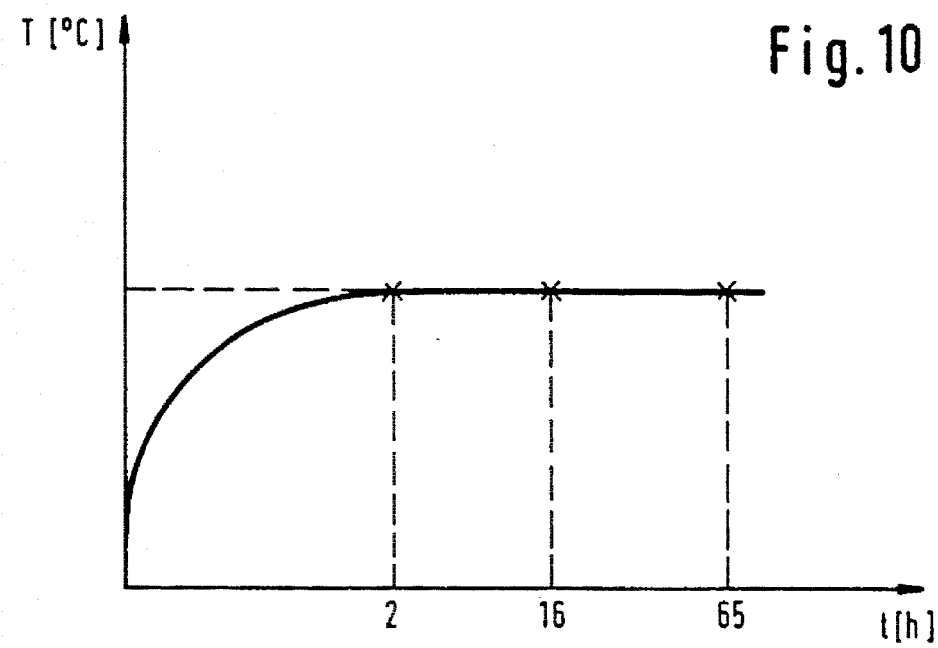
FIG. 10 is a graph illustrating the undercooling temperature as a function of time.

The tendency of the curve representing the undercooling temperature as a time function is shown in FIG. 10. Most important is the fact that this graph contains a threshold above which the undercooling temperature may be regarded to be stabilized, with the undercooling temperature at 2 hours already being representative for this stabilized temperature. The "stabilized" temperatures of crystallization by undercooling are more elevated as compared to the lines $T_{surf1}$ and $T_{Surf2}$. They were measured according to the following manner: 5 grams of material are brought to 1,500° C., i.e. to a temperature 100°–200° C. above the $T_{TSD1}$, in a platinum-gold crucible, for a duration of 30 minutes. The temperature of the furnace is then lowered to the measurement temperature. The inertia or response time of the furnace is thus that the measurement temperature is attained after at most one quarter of an hour. After two hours of sojourn time at this temperature, the molten material is quenched and the sample is observed for presence of crystals under a microscope. For composition no. 10, an undercooling temperature for the spinel phase was measured which is higher than the liquidus temperature, something theoretically impossible; this aberrant value, with regard to the high boron oxide content, is probably due to a modification of the tested composition at the phase of pre-heating to 1,500° C.

Figure 11:
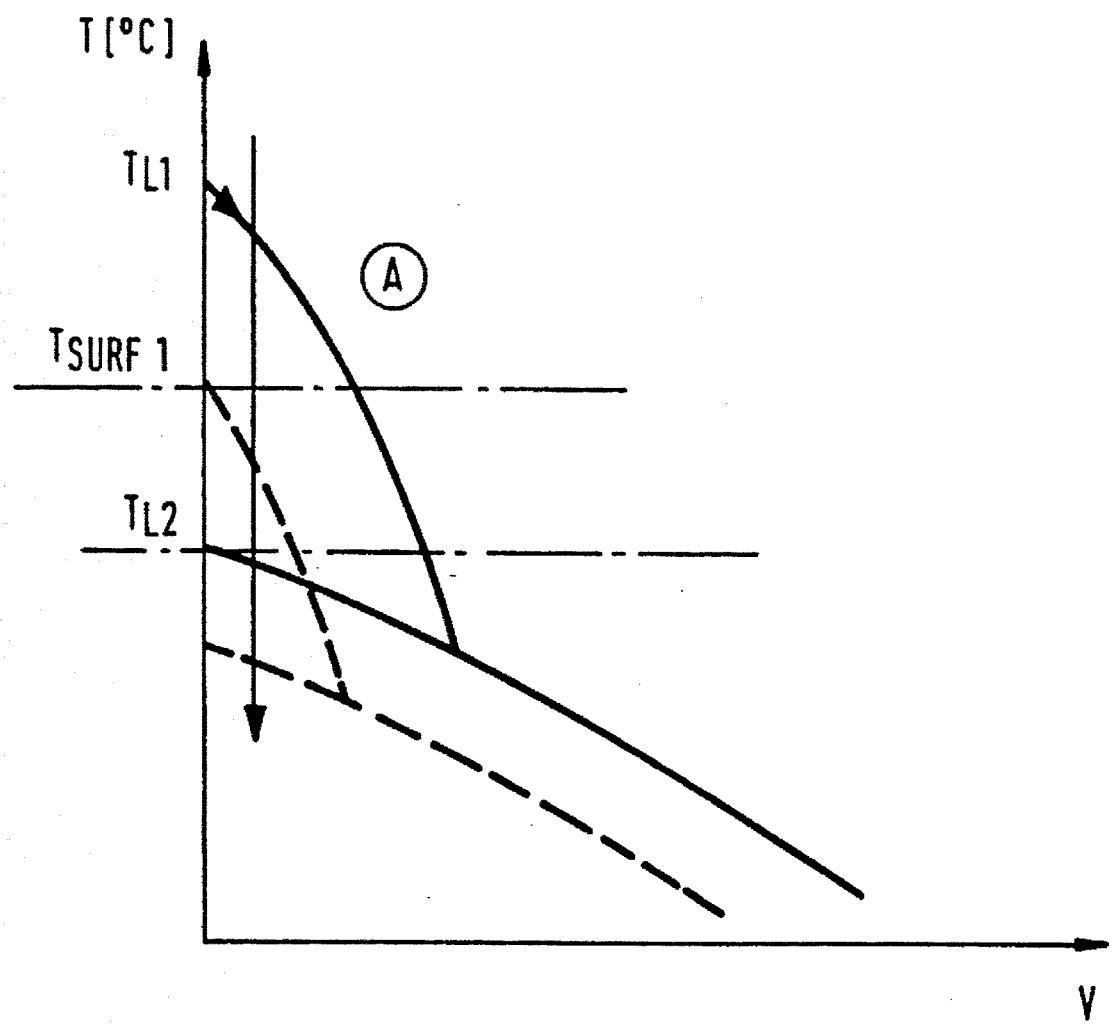
FIG. 11 is a graph illustrating the problems associated with the appearance of various crystal species (temperature/crystal size diagram).

The temperature difference between undercooling and liquidus temperatures, according to an initial hypothesis of the inventors, may be explained by referring to FIG. 11 where the tendency of the curves of crystal growth speeds (in unbroken lines) and of nucleation (dotted lines) is shown. The graph corresponding to nucleation is offset towards the lower temperatures in relation to the graph representing crystal growth. Therefore, when one starts from a high temperature as indicated by the arrow in FIG. 11, at which all of the nuclei have been destroyed (a temperature higher than the upper devitrification temperature $T_{SD}$ during at least 30 minutes), one first passes through a zone A wherein the crystal growth speed is not zero except for the liquidus point (which strictly corresponds to a zero crystallization speed) but where those cannot develop due to lack of nuclei. Without reaction with crucible or spinner material, or also "pollution" of the environment for example by airborne particles, the absence of crystals is therefore a stable phenomenon over time. It has been verified experimentally that the undercooling temperature value is identical for measurements at 2, 10 or 65 hours. At undercooling temperature, the nuclei begin to appear. Nevertheless, the nucleation speed may be relatively low for temperatures not much lower than the undercooling temperature. What ensues is a retarded appearance of the crystals, and even more retarded as their growth rate also is still low. This would tend to explain why it is possible to measure the viscosity of the material even at temperatures well below the crystallization temperature in undercooled state, with the viscosity curves obtained by progressively cooling the material. If cooling is continued, there is competition with other crystal species, but those will grow starting from the first crystals already formed, with a speed that is sometimes very high. This is the reason why all the heating devices should be employed in order that the temperature of the material may never, not even by accident, and particlularly during start-up phases, drop below temperature $T_{L2}$.

With the exception of composition no. 26 which qualifies as a glass composition, all of the compositions in the table used according to the invention correspond to materials with high melting points, typically with liquidus temperatures between 1,200° C. and 1,400° C.

The majority of tested compositions have liquidus temperatures ($T_{L1}$) outside the fiberization or working range, or at least outside the preferred fiberization range. On the other hand, all of these compositions have a crystallization temperature in undercooled state that is compatible with the fiberization range if this is defined in a broad way (viscosity between 100 and 3,500 poises). However, compositions nos. 3 and 10 impose working at viscosities below 350 poises which, as mentioned above, favor the appearance of beads very much.

On the other hand, it must be said that composition no. 8 is quite particularly hard with a liquidus above 1,300° C., but may nevertheless be utilized for fiberizing at a relatively high viscosity, with the viscosity of 3,200 poises being reached at a temperature of 1,268° C., which gives an additional margin of more than 50° C. compared with the crystallization temperature in undercooled state.

The preferred compositions according to the invention which also permit operation in a temperature interval of at least 50° C. are compositions nos. 1, 2, 4, 5, 8, 13, 14, 15 and 16. For these preferred compositions, the silica plus aluminum plus phosphorus pentoxide aggregate content lies between 67 and 73 weight percent. For these compositions, the quantity of fluxing agents CaO+MgO lies betweeen 8.5 and 18 weight percent.

Application of the invention is illustrated by means of FIGS. 8a and 8b which show diagrammatic representations of installation according to prior art and according to the invention, respectively.

The device used for the invention is derived from the apparatus traditionally used for the production of glass wool by internal centrifuging, and has been the object of detailed descriptions, especially in the patent specifications FR-B1-2443436 and EP-B1-91381. This conventional device sketched in FIG. 8a consists chiefly of a spinner 1, the peripheral wall 2 of which has a multiplicity of discharge orifices. The peripheral wall 2 is connected to a flange 3 via a connecting band 4, referred to as a "tulip" because of its shape. As illustrated by the drawing, peripheral wall 2, tulip 4 and flange 3 are formed as a whole in one single, unitary piece.

Flange 3 is mounted on a supporting shaft 5 which is hollow in the shown embodiment, and through this cavity the molten mineral material is supplied.

The supporting shaft 5—or even the flange 3—furthermore supports a concentric distributing means 6, usually referred to as a "cup" or "basket". The distributing cup 6, with a peripheral wall which has a relatively low number of orifices with comparatively large diameters, serves as the bottom wall of the spinner and distributes the molten mineral material in such a way that the centrally supplied stream of molten mineral material is separated into a plurality of streamlets and distributed onto the inner circumference of peripheral wall 2.

The spinner 1 is surrounded by diverse heating devices: an annular magnet 7 of an induction heater which particularly heats the bottom portion of the spinner 1, above all in order to compensate cooling upon contact with environmental air which is strongly cooled by the considerable quantities of air sucked by the revolution of the spinner 1 and by a water cooled annular external burner 8. The ends of channel walls 9 and 10 of the external burner 8 are arranged at a slight vertical distance h from the spinner 1, for instance in the order of 5 mm, as shown in a simplified manner by the sketch at the top left side of FIG. 8a.

The annular external burner 8 generates a high temperature and high velocity gas flow substantively directed vertically downwards and thus passing along peripheral wall 2. The gas flow on one hand serves to heat, or maintain the temperature of peripheral wall 2, and on the other hand contributes to attenuating the filaments of spun-off molten mineral into fibers.

As represented in the drawing, the external burner 8 preferably is surrounded by a blower ring 11 for cold air, e.g. pressurized air, the main objective of which is to limit radial expansion of the hot gas flow and thereby keep the formed fibers from getting into contact with the annular magnet 7.

These external heaters of spinner 1 are complemented in its inside by an internal annular burner 12 which is positioned inside the supporting shaft 5 and utilized merely during the start-up phase of the fiberization unit for preheating the cup 6.

As illustrated by FIG. 8*b*, a fiberization device according to the invention consists of the same components, and only the differences shall be discussed in the following.

The most striking difference concerns the position of the annular external burner shown at 13, with channel walls 14 and 15, the ends of which are positioned at a distance h' above the peripheral wall shown at 19, which is distinctly larger than the distance h according to FIG. 8*a*. These relations, too, are illustrated in a simplified manner by the sketch at the top right side of FIG. 8*b*. For example, a distance h' in the range of 15 to 30 mm, particularly in the range of 20 to 25 mm is preferred as such a distance still permits a high flow accuracy of the gas flow. Furthermore, the inner channel wall 14 has a diameter which is distinctly smaller than the diameter of the top side of peripheral wall 19. In order to guide the gas flow upon emission, the discharge orifice of external burner 13 is limited by two oblique surfaces 16 and 17 at right angles to each other, thus for example inclined to the outside by app. 45°. In order to limit the problems with radial expansion of the hot gas from external burner 13, the outer oblique surface 17 is only about half as long as the inner oblique surface 16 and ends in an essentially vertical wall. The oblique surface 16 and the vertical wall end at a height above the spinner that essentially corresponds to the vertical distance h of channel walls 9 and 10 of a conventional external burner 8 (cp. FIG. 8*a*).

With such an arrangement of external burner 13, not only the peripheral wall 19 of the spinner 1', but also the tulip, now shown at 20, is being heated. The gas flow, however, should not rise along the tulip 20 and heat the supporting shaft, now shown at 22, of the spinner, now shown at 1'. In order to avoid this, an annular protrusion 21 or a different, revolving sealing element can be provided here to be arranged, for instance, at half the height of tulip 20, with this position determining the length of tulip 20 which is heated by the annular gas flow. It is also possible to pressurize the gap between the supporting shaft 22 and a peripheral wall 23. For this purpose, for instance, cold air can be introduced at the top side of supporting shaft 22, this introduction more specifically being preferred in a direction perpendicular to the axis of revolution as merely a fluid barrier is to be obtained hereby, and not a stream of cold air directed at the tulip 20.

A comparison between FIGS. 8*a* and 8*b* shows one more essential difference consisting in that a second internal burner 25 has been provided which is positioned concentrically around the central inner annular burner, now shown at 26 and, as usually, serving to heat the cup, now shown at 27. The second internal burner 25 is an annular burner with diverging flames which are directed at the inner surfaces of the peripheral wall 19 and of the tulip 20. The arrangement of flames is preferably optimized by protrusions 29 on the inside of tulip 20 which serve as flame retention means.

In the case of the embodiment in FIG. 8*b*, the cup 27 has a relatively thick bottom wall 28 which for instance is formed of a ceramic plate or heat resistant concrete in order to avoid rapid erosion by the molten mineral material. In addition, the thick bottom wall 28 serves as a heat insulation and thereby prevents cooling of the inside of the bottom wall due to gas or air flow induced or sucked in by the rotation of the spinner 1'.

Finally, it can be noted that the spinner form has preferably been modified somewhat in order to bring about sojourn times of the molten mineral material inside the spinner which are as short as possible. This modification may principally consist in a reduction of the total height of the peripheral wall—for an identical total height of the perforation—in such a way as to keep the last row of orifices close to the spinner bottom in order to avoid the creation of stagnating zones.

Tests have been made with a material to be fiberized corresponding to composition no. 2 with characteristics of the apparatus and variations in the operating conditions summarized in the following tables. These tests were carried out with spinners of 200 mm diameter and an external burner with a channel wall distance of 6.5 mm. The molten mineral material flows onto a basket or cup of 70 mm diameter with a peripheral wall pierced by 150 orifices. The flow range of diverging internal burners IB has been indicated in standardized cubic meters per hour. The converging internal burner was not employed except during the pre-heating period.

Hot and low-temperature points correspond to the extreme temperatures registered on the peripheral wall.

It should be noted that the temperature of the molten mineral material or "glass" was measured with a thermocouple placed at the exit of the furnace at about 2 meters from the cup bottom, correctly calibrated previously. The temperatures given for the spinner and the gas flow of the external burner are, on the other hand, measured by means of a disappearing filament optical pyrometer, calibrated relative to a black body. Due to multiple turbulences due to the gaseous flows, the measured values cannot be strictly precise, on the other hand, they are certainly pertinent in relative values by comparison between the different tests.

On the other-hand, it must be kept in mind that the registered values correspond to values at equilibrium measured after at least 15 minutes of feeding, with spinner and cup pre-heated by means of all of the available heating devices (with the exception of the diverging internal burner for the first test).

The spinners used for these tests are made of a nickel-based ODS alloy of the austenitic type with 30% chromium, a melting temperature of 1,380° C., a tearing resistance of 130 MPa at 1,150° C., a creep resistance equalling 70 or 55 MPa after 1,000 hours at 1,150° C. and 1,250° C., respectively, and a ductility of 5% at 1,250° C.

In the case of the ferritic alloy, the ODS alloy comprises an iron base with 20% chromium and 5.5% aluminium. Its melting temperature is 1,480° C., its tearing resistance 110 MPa at 1150° C., its creep resistance after 1,000 hours equalling 60 or 50 MPa after 1,000 hours at 1,150° C. and 1,250° C., respectively, and its ductility 3% at 1,250° C.

As regards the quality of the produced fibers, the value of F/5g corresponds to the Micronaire. The Micronaire is a standard method for characterizing the fineness of fibers and currently employed by the manufacturers of mineral wool; with regard to details, reference is made to the German Industrial Standard (DIN) 53941 "Bestimmung des Micronaire" (Micronaire reading) and to the Standard ASTM D 1448 "Micronaire reading of cotton fibers". For instance, so-called light insulating products of glass wool for which the main criterion is thermal resistance (rolled products with a density less than 40 kg/m³), are often based on mineral wool with a Micronaire 3 whereas heavier products for which a considerable mechanical resistance is desired are based on fibers with a Micronaire 4.

The first test with a very hot glass and spinner, essentially heated by the annular external burner structured as in FIG. 8a, permitted production of good quality mineral wool with a low bead content, but with a very short spinner life. After only 30 minutes, fiberization had to be stopped because most of the orifices had been clogged. During analysis, it was found additionally that the spinner had melted in places. The temperature conditions were thus at the same time too hot (very high glass temperature) and too low (spinner at only 1,200° C.).

Another remarkable point is the spinner temperature at start-up. Indeed, in the configuration of test 1, pre-heating of the spinner was achieved only by means of the external heating devices and the converging internal burner. Under these conditions, the hottest point was a temperature lower than 950° C. and the low points below 900° C. were furthermore observed, such that the beginning of feeding brings about a considerable thermal shock and actually materialized risks of clogging.

For this reason, the diverging internal burner was used during pre-heating and during fiberization in the subsequent tests. Under these conditions, it was possible to raise the temperature of the spinner peripheral wall by about 200° C., thereby bringing it to approximately 1,150° C., such that once feeding started, the temperature of the material was always higher than the crystallization temperature in undercooled state for the spinel phase (1,250° C.).

The subsequent tests were otherwise carried out with an external burner according to the invention. As is evident from the tables, this configuration permitted to raise the temperature of the pierced wall of the spinner very substantially while at the same time lowering the temperature of the glass. The two used alloys gave satisfactory results, something which was relatively unexpected for the least heat resistant austenitic alloy.

The efficiency of such dispositions was immediate, with the lifetime of the spinner lasting for 13 h 30 in test 2 and for 26 hours in test 3, with a lesser glass temperature but a much greater action of the heating devices.

The best results were achieved with a spinner temperature in the vicinity of 1,260°–1,270° C. (for this composition, the viscosity lies between 350 and 1,000 poises between 1,300° C. and 1,216° C.; this is consequently well inside the range of fiberization). This temperature is significantly below the liquidus temperature (1,290° C.) but effectively higher than the upper crystallization temperature in undercooled state. Tests 3 and 4 were conducted with a limited temperature, with points measured below the value of the $T_{surfl}$. This tends to show that it is possible to fiberize even during time periods in excess of twenty hours in critical conditions, but by remaining well above the crystallization temperature in undercooled state of the silicate phase. And it is to be noted throughout that uncertainties of measurement precision call for a certain caution during interpretation.

Spinner lifetimes start to extend when the orifice diameters of the spinner are diminished. Thus, between test 4 and test 5, the lifetime of the spinner has more than doubled from 23 hours to more than 50 hours (fiberization was interrupted on purpose). According to the invention, the preferred diameter is smaller than 0.4 mm while remaining larger than 0.10 mm.

It was also possible to note that the best results are achieved by balancing the different sources of heat input, in particular by proceeding with a relatively high flow rate of gas for the internal burner (but anyway at hardly the tenth part of the flow rate for the external burner) and a similarly large amount of power supplied to the annular magnet.

The use of the principles of the present invention is of particular advantage when in conjunction with the subject matter of the parallel patent application "Method and Apparatus for the Production of Mineral Wool, and Mineral Wool Thereby Produced" filed for the same applicant company or assignee, respectively, on even date, the full contents thereof being herewith incorporated herein by reference.

|  | TEST 1 | TEST 2 | TEST 3 |
| --- | --- | --- | --- |
| Pull rate | 3.0 t/day | 4.0 t/day | 4.8 t/day |
| Glass | 1,570° C. | 1,545° C. | 1,520° C. |
| Alloy | austenitic | austenitic | ferritic |
| No. of orifices | 10,080 | 9,000 | 9,000 |
| Orifice diameter | 0.4 mm | 0.4 mm | 0.4 mm |
| External burner | FIG. 8a | FIG. 8b | FIG. 8b |
| Diverging IB | 0 | 2.6 Nm³/h | 2.6 Nm³/h |
| Hot point | 1,200° C. | 1,280° C. | 1,265° C. |
| Low point | not measured | 1,250° C. | 1,230° C. |
| F/5 g | 2.65 | 3.3 | 3.5 |
| Average diameter | 4.2 μm | 4.7 μm | 4.7 μm |
| Beads >100 μm | 1.5% | 2.8% | 4.0% |

|  | TEST 4 | TEST 5 | TEST 6 |
| --- | --- | --- | --- |
| Pull rate | 5.9 t/day | 5.8 t/day | 5.8 t/day |
| Glass | 1,490° C. | 1,475° C. | 1,490° C. |
| Alloy | ferritic | austenitic | austenitic |
| No. of orifices | 9,000 | 9,000 | 9,000 |
| Orifice diameter | 0.35 mm | 0.3 mm | 0.3 mm |
| External burner | FIG. 8b | FIG. 8b | FIG. 8b |
| Diverging IB | 2.5 Nm³/h | 2.5 Nm³/h | 3.5 Nm³/h |
| Hot point | 1,275° C. | 1,280° C. | 1,290° C. |
| Low point | 1,210° C. | 1,255° C. | 1,240° C. |
| F/5 g | 3.5 | 3.0 | 3.1 |
| Average diameter | 4.7 μm | 3.2 μm | 4.5 μm |
| Beads >100 μm | 3.1% | 1.5% | 0.6% |

C245-06.WP5

| TABLE OF COMPOSITIONS | | | | | | | | |
| --- | --- | --- | --- | --- | --- | --- | --- | --- |
|  | 1 | 2 | 3 | 4 | 5 | 6 | 7 | 8 |
| $SiO_2$ | 50.45 | 51.5 | 49.40 | 52.9 | 54.93 | 56.0 | 52.26 | 52.65 |
| $Fe_2O_3$ | 10.35 | 10.1 | 11.75 | 15.2 | 8.3 | 12.18 | 7.6 | 6.5 |
| $Al_2O_3$ | 17.35 | 18 | 15.8 | 13.6 | 17.17 | 14.37 | 18.96 | 19.85 |
| MnO | 0.17 | 0.19 | 0.2 | 0.2 | 0.15 | 0.23 | 0.1 | 0.1 |
| CaO | 9.90 | 8.9 | 10.80 | 5.75 | 7.12 | 6.3 | 6.52 | 5.3 |
| MgO | 7.05 | 6.4 | 6.4 | 3.8 | 5.10 | 4.48 | 4.31 | 3.3 |
| $Na_2O$ | 3.35 | 3.5 | 3.1 | 2.7 | 3.55 | 3.2 | 5.52 | 6.1 |
| $K_2O$ | 0.45 | 0.61 | 0.4 | 2.20 | 2.19 | 1.49 | 4.11 | 5.5 |
| $TiO_2$ | 0.75 | 0.66 | 2.1 | 3.0 | 1.20 | 1.33 | 0.5 | 0.5 |
| $P_2O_5$ | 0.15 | 0.12 | — | 0.6 | 0.28 | 0.34 | 0.1 | 0.1 |
| $B_2O_3$ | — | — | — | — | — | — |  |  |

-continued

|  |  |  |  |  |  |  |  |  |
|---|---|---|---|---|---|---|---|---|
| $SiO_2 + Al_2O_3 + P_2O_5$ | 68 | 69.6 | 62.5 | 67.1 | 72.4 | 70.7 | 71.1 | 72.5 |
| CaO + MgO | 17 | 15.3 | 17.2 | 9.5 | 12.2 | 10.8 | 10.8 | 8.6 |
| lgμ = 2 | 1,369° C. | 1,406° C. | 1,318° C. | 1,442° C. | 1,470° C. | 1,520° C. | 1,520° C. | 1,597° C. |
| lgμ = 2.5 | 1,270° C. | 1,300° C. | 1,222° C. | 1,327° C. | 1,360° C. | 1,397° C. | 1,403° C. | 1,467° C. |
| lgμ = 3 | 1,191° C. | 1,216° C. | — | 1,238° C. | 1,268° C. | 1,297° C. | 1,305° C. | 1,364° C. |
| lgμ = 3,5 | 1,120° C. | 1,139° C. | — | 1,160° C. | 1,185° C. | 1,205° C. | 1,216° C. | 1,268° C. |
| $T_{L1}$ | 1,310° C. | 1,290° C. | 1,210° C. | 1,330° C. | 1,270° C. | 1,290° C. | 1,290° C. | 1,310° C. |
| $T_{L2}$ | 1,230° C. | 1,220° C. | 1,210° C. | 1,220° C. | 1,220° C. | 1,170° C. | 1,180° C. | 1,150° C. |
| $T_{SD\,1}$ | 1,340° C. | 1,350° C. | 1,280° C. | 1,350° C. | 1,300° C. | 1,300° C. | 1,340° C. | 1,350° C. |
| $T_{SD\,2}$ | 1,250° C. | 1,260° C. | 1,220° C. | 1,290° C. | 1,250° C. | 1,230° C. | 1,200° C. | 1,210° C. |
| $T_{Surf\,1}$ | 1,250° C. | 1,250° C. | 1,200° C. | 1,260° C. | 1,230° C. | 1,270° C. | 1,190° C. | 1,200° C. |
| $T_{Surf\,2}$ | 1,150° C. | 1,120° C. | 1,130° C. | 1,100° C. | 1,100° C. | 1,090° C. | 1,150° C. | 1,110° C. |

TABLE OF COMPOSITIONS

|  | 9 | 10 | 11 | 12 | 13 | 14 | 15 |
|---|---|---|---|---|---|---|---|
| $SiO_2$ | 49.40 | 47.90 | 47.5 | 55.3 | 52.60 | 46.55 | 48.77 |
| $Fe_2O_3$ | 10.10 | 9.80 | 9.7 | 7.78 | 8.75 | 8.78 | 8.80 |
| $Al_2O_3$ | 17.00 | 16.40 | 16.3 | 19.1 | 14.58 | 14.7 | 14.65 |
| MnO | 0.15 | 0.15 | 0.16 | 0.12 | 0.12 | 0.17 | 0.17 |
| CaO | 9.70 | 9.4 | 12.4 | 10.4 | 12.20 | 12.25 | 12.25 |
| MgO | 6.90 | 6.70 | 6.7 | 3.9 | 6.33 | 6.2 | 6.2 |
| $Na_2O$ | 3.25 | 3.15 | 3.20 | 1.8 | 2.24 | 2.2 | 2.2 |
| $K_2O$ | 0.45 | 0.40 | 0.40 | 0.68 | 1.05 | 1.02 | 1.02 |
| $TiO_2$ | 0.75 | 0.70 | 0.70 | 0.83 | 1.82 | 1.89 | 1.9 |
| $P_2O_5$ | 0.15 | 0.14 | 2.9 | — | 0.30 | 6.21 | 4 |
| $B_2O_3$ | 2.15 | 5.25 |  |  | — | — | — |
| $SiO_2 + Al_2O_3 + P_2O_5$ | 66.55 | 66.44 | 66.7 | 74.4 | 67.48 | 67.46 | 67.42 |
| CaO + MgO | 16.60 | 16.10 | 19.1 | 14.3 | 18.53 | 18.45 | 18.45 |
| lgμ = 2 | 1,346° C. | 1,332° C. | 1,327° C. | 1,509° C. | 1,370° C. | 1,352° C. | 1,363° C. |
| lgμ = 2.5 | 1,248° C. | 1,233° C. | 1,240° C. | 1,400° C. | 1,270° C. | 1,255° C. | 1,264° C. |
| lgμ = 3 | 1,168° C. | 1,151° C. | 1,162° C. | 1,309° C. | 1,188° C. | 1,176° C. | 1,184° C. |
| lgμ = 3,5 | 1,097° C. | #1,080° C. | #1,096° C. | 1,225° C. | 1,115° C. | 1,104° C. | 1,112° C. |
| $T_{L1}$ | 1,260° C. | 1,230° C. | 1,210° C. | 1,270° C. * | 1,230° C. | 1,220° C. | 1,230° C. |
| $T_{L2}$ | 1,210° C. | 1,170° C. | 1,200° C. | 1,250° C. | 1,220° C. | 1,200° C. | 1,200° C. |
| $T_{SD\,1}$ | 1,300° C. | 1,270° C. | 1,250° C. | 1,320° C. | 1,290° C. | 1,380° C. | 1,360° C. |
| $T_{SD\,2}$ | 1,230° C. | 1,170° C. | 1,220° C. | 1,290° C. | 1,250° C. | 1,210° C. | 1,220° C. |
| $T_{Surf\,1}$ | 1,260° C. | 1,270° C. ? |  | 1,160° C. | 1,170° C. * | 1,180° C. | 1,160° C. |
| $T_{Surf\,2}$ | 1,110° C. | 1,100° C. |  | 1,140° C. | — | 1,050° C. | 1,100° C. |

TABLE OF COMPOSITIONS

|  | 16 | 17 | 18 | 19 | 20 | 21 | 22 |
|---|---|---|---|---|---|---|---|
| $SiO_2$ | 50.80 | 47.01 | 57.85 | 58.54 | 61.2 | 59.08 | 56.26 |
| $Fe_2O_3$ | 8.80 | 12.1 | 0.16 | 0.19 | 6.1 | 0.27 | 0.13 |
| $Al_2O_3$ | 14.65 | 14.7 | 2.9 | 3.85 | 0.1 | 3.15 | 2.9 |
| MnO | 0.17 | 0.24 | — | 0.03 | 0.01 | — | 0.02 |
| CaO | 12.25 | 10.1 | 28 | 25 | 18.6 | 22.1 | 23.2 |
| MgO | 6.2 | 8.6 | 6.4 | 9.25 | 9.3 | 15.1 | 4. |
| $Na_2O$ | 2.2 | 3.06 | 1.2 | 0.05 | 4.5 | 0.06 | 9.1 |
| $K_2O$ | 1.01 | 1.40 | 0.55 | 0.08 | 0.04 | 0.09 | 0.8 |
| $TiO_2$ | 1.9 | 2.6 | 0.12 | 0.02 | 0.14 | 0.02 | 0.07 |
| $P_2O_5$ | 2 | — | 2.6 | 2.85 | — | — | — |
| $B_2O_3$ | — | — | — | 0.05 | — | — | 3.25 |
| $SiO_2 + Al_2O_3 + P_2O_5$ | 67.45 | 61.71 | 63.35 | 65.24 | 61.3 | 62.23 | 59.16 |
| CaO + MgO | 18.45 | 18.7 | 34.4 | 34.25 | 27.9 | 37.2 | 27.2 |
| lgμ = 2 | 1,368° C. | 1,279° C. | 1,255° C. | 1,319° C. | 1,276° C. | 1,280° C. | 1,200° C. |
| lgμ = 2.5 | 1,269° C. | #1,190° C. | 1,175° C. | 1,235° C. | — | — | — |
| lgμ = 3 | 1,188° C. | — | 1,100° C. | 1,169° C. | — | — | — |
| lgμ = 3,5 | 1,116° C. | — | — | 1.112° C. | — | — | — |
| $T_{L1}$ | 1,230° C. | 1,300° C. | 1,290° C. | 1,330° C. |  | 1,360° C. | 1,230° C. |
| $T_{L2}$ | 1,200° C. | 1,200° C. | — | — |  |  |  |
| $T_{SD\,1}$ | 1,320° C. | 1,320° C. |  |  |  |  |  |
| $T_{SD\,2}$ | 1,220° C. | 1,230° C. |  |  |  |  |  |
| $T_{Surf\,1}$ | 1,160° C. | 1,270° C. | 1,150–1,200° C. | 1,250–1,300° C. |  |  |  |
| $T_{Surf\,2}$ | 1,140° C. | 1,150° C. |  |  |  |  |  |

-continued

TABLE OF COMPOSITIONS

|  | 23 | 24 | 25 | 26 | 27 | 28 | 0 |
|---|---|---|---|---|---|---|---|
| $SiO_2$ | 50.25 | 53.71 | 49.3 | 60.7 | 58.3 |  | 63 |
| $Fe_2O_3$ | 2.85 | 2.6 | 8.4 |  | 0.14 |  | 0.3 |
| $Al_2O_3$ | 6.5 | 5.8 | 15.6 | 0.2 | 7 |  | 3 |
| MnO |  | 0.01 |  |  |  |  |  |
| CaO | 20.9 | 29.9 | 13.9 | 16.5 | 24.85 |  | 7.35 |
| MgO | 12 | 3.2 | 7.6 | 3.2 | 5 |  | 3.1 |
| $Na_2O$ | 6.4 | 3.1 | 3.5 | 15.4 | 0.02 |  | 14.1 |
| $K_2O$ | 0.75 | 1.4 | 0.5 | 0.7 | 0.05 |  | 0.8 |
| $TiO_2$ | 0.35 | 0.12 | 1.0 |  | 0.14 |  |  |
| $P_2O_5$ | — |  |  | 3.3 | 4.5 |  | 5.9 |
| $B_2O_3$ | — |  |  |  |  |  |  |
| $SiO_2$ + $Al_2O_3$ + $P_2O_5$ | 56.75 | 59.51 | 64.9 | 64.2 | 69.8 |  | 71.9 |
| CaO + MgO | 32.9 | 33.1 | 21.5 | 19.7 | 29.85 |  | 10.45 |
| $lg\mu = 2$ | 1,180° C. | 1,265° C. | 1,310° C. | 1,220° C. | 1,408° C. |  | 1,317° C. |
| $lg\mu = 2.5$ | — | 1,180° C. | 1,225° C. | 1,100° C. | 1,310° C. |  | 1,187° C. |
| $lg\mu = 3$ | — | 1,120° C. | 1,150° C. | 1,015° C. | 1,235° C. |  | 1,084° C. |
| $lg\mu = 3,5$ | — | — | — | 950° C. | 1,170° C. |  | 1,000° C. |
| $T_{L1}$ | 1,300° C. | 1,350° C. | 1,230° C. | 1,120° C. | >1,300° C. |  | 920° C. |
| $T_{L2}$ |  |  |  |  |  |  |  |
| $T_{SD\,1}$ |  |  |  |  |  |  |  |
| $T_{SD\,2}$ |  |  |  |  |  |  |  |
| $T_{Surf\,1}$ |  |  |  |  | 1,300–1,400° C. |  |  |
| $T_{Surf\,2}$ |  |  |  |  |  |  |  |

We claim:

1. A method for producing mineral wool, comprising:
   providing a material having a liquidus temperature above 1200° C. and a viscosity of less than 5000 poises at said liquidus temperature;
   melting said material;
   heat treating said molten material for a treatment period sufficient to destroy all nuclei of crystallization;
   introducing the molten material into a spinner having a peripheral wall that comprises a plurality of orifices;
   centrifuging the molten material through said plurality of orifices thereby forming a plurality of filaments;
   attenuating said plurality of filaments by subjecting said plurality of filaments to a heated gas flow flowing along said peripheral wall, said heated gas flow being heated by an annular external burner concentrically disposed with respect to said spinner; and
   maintaining a spinner temperature during ongoing operation of said spinner so that said spinner temperature is lower than or equal to a temperature at which the viscosity of the molten material is 100 poises, and higher than a crystallization temperature in an undercooled state of the molten material.

2. The method of claim 1, wherein said treating step comprises:
   maintaining the molten material at a temperature higher than or equal to an upper temperature of devitrification $T_{SD}$ of the molten material for at least 30 minutes.

3. The method of claims 1 or 2, wherein said crystallization temperature in an undercooled state of the molten material is stabilized so that said crystallization temperature in an undercooled state does not depend upon a duration of said treatment period.

4. The method of claim 4, wherein said spinner temperature is maintained in part through heating means disposed within said spinner.

5. The method of claim 1, wherein said heating means comprises a diverging internal annular burner.

6. The method of claim 5, wherein said diverging internal annular burner generates flames proximate to an inner surface of said peripheral wall of said spinner.

7. The method of claim 6, further comprising:
   retaining said flames proximate to said inner surface of said peripheral wall of said spinner by flame retention means disposed at an inner surface of a tulip-shaped skin of said spinner.

8. The method of claim 1, wherein said annular external burner is disposed approximately 15 to 20 mm from an upper side of said peripheral wall of said spinner.

9. The method of claim 1, wherein said annular external burner comprises an inner wall and an outer wall, said inner wall and said outer wall defining a discharge channel for emission of said heated gas flow, wherein a diameter of said inner wall is smaller than a diameter of an upper side of said peripheral wall of said spinner.

10. The method of claim 1, wherein said annular external burner comprises channel wall defining a discharge channel, each of said channel walls including an oblique surface, thereby forming a flaring discharge orifice for said heated gas flow.

11. The method of any one of claims 8 to 10, further comprising:
    preventing said gas flow from back-flowing away from said peripheral wall by sealing means.

12. The method of claim 1, wherein said spinner temperature is maintained in part through an annular induction heater.

13. The method of claim 1, further comprising:
    feeding the molten material to a distributing means, said distributing means comprising a bottom wall and a protective plate of heat resistant insulating material.

14. The method of claim 1, wherein said spinner is configured to avoid zones where the molten material stagnates.

15. The method of claim 1, wherein said spinner comprises a cobalt-based alloy reinforced with carbides.

16. The method of claim 1, wherein said spinner comprises a nickel-based alloy with gamma prime reinforcement.

17. The method of claim 1, wherein said spinner comprises a ceramic material.

18. The method of claim 17, wherein said ceramic material comprises silicon nitride.

19. The method of claim 17, wherein said ceramic material comprises silicon carbide.

20. The method of claim 1, wherein said spinner comprises an oxide dispersion strengthened (ODS) alloy.

21. The method of claim 20, wherein said ODS alloy has the following composition:

Cr 13 to 30% wt.

Al 2 to 7% wt.

Ti less than 1% wt.

$Y_2O_3$ 0.2 to 1% wt.

Fe remainder.

22. The method of claim 20, wherein said ODS alloy has the following composition:

Cr 15 to 35% wt.

C 0 to 1% wt.

Al 0 to 2% wt.

Ti 0 to 3% wt.

Fe less than 2% wt.

$Y_2O_3$ 0.2 to 1% wt.

Ni remainder.

* * * * *